US008325703B2

(12) United States Patent
Pernu

(10) Patent No.: US 8,325,703 B2
(45) Date of Patent: Dec. 4, 2012

(54) MULTIRADIO SCHEDULING INCLUDING CLOCK SYNCHRONIZATION VALIDITY PROTECTION

(75) Inventor: Ville Pernu, Tempere (FI)

(73) Assignee: Nokia Corporation, Espoo (FI)

( * ) Notice: Subject to any disclaimer, the term of this patent is extended or adjusted under 35 U.S.C. 154(b) by 1049 days.

(21) Appl. No.: 11/465,041

(22) Filed: Aug. 16, 2006

(65) Prior Publication Data
US 2008/0043714 A1    Feb. 21, 2008

(51) Int. Cl.
H04J 3/06 (2006.01)
H04B 7/212 (2006.01)
H04B 1/06 (2006.01)
H04L 7/00 (2006.01)
H04W 36/00 (2009.01)

(52) U.S. Cl. ........ 370/350; 455/436; 455/439; 455/442; 455/265; 370/324; 370/503; 370/304

(58) Field of Classification Search .................. 370/350; 455/436
See application file for complete search history.

(56) References Cited

U.S. PATENT DOCUMENTS

| | | | | |
|---|---|---|---|---|
| 6,400,706 | B1 * | 6/2002 | Cousineau | 370/350 |
| 2002/0059434 | A1 * | 5/2002 | Karaoguz et al. | 709/228 |
| 2002/0109495 | A1 * | 8/2002 | Antone et al. | 324/76.54 |
| 2003/0083095 | A1 | 5/2003 | Liang | |
| 2004/0090935 | A1 * | 5/2004 | Courtney | 370/331 |
| 2004/0248615 | A1 * | 12/2004 | Purkayastha et al. | 455/552.1 |
| 2005/0018706 | A1 | 1/2005 | Myojo | |
| 2005/0075122 | A1 * | 4/2005 | Lindoff et al. | 455/522 |
| 2005/0213693 | A1 * | 9/2005 | Page | 375/354 |
| 2006/0014561 | A1 * | 1/2006 | Morinaga et al. | 455/553.1 |
| 2006/0221926 | A1 * | 10/2006 | Maekawa et al. | 370/345 |
| 2007/0263709 | A1 | 11/2007 | Kasslin et al. | |
| 2007/0263710 | A1 | 11/2007 | Kasslin et al. | |
| 2007/0265034 | A1 | 11/2007 | Kasslin et al. | |
| 2007/0281743 | A1 | 12/2007 | Palin et al. | |
| 2008/0043714 | A1 | 2/2008 | Pernu | |
| 2008/0240048 | A1 | 10/2008 | Okker et al. | |
| 2008/0291830 | A1 | 11/2008 | Pernu et al. | |

FOREIGN PATENT DOCUMENTS

EP    1617599 A1    1/2006
WO    2005083944 A1    9/2005

OTHER PUBLICATIONS

Notification of Transmittal of the International Search Report and the Written Opinion of the International Searching Authority, or the Declaration, PCT/IB2007/001955, International Filing Date Nov. 7, 2007, Nokia Corporation et al.

* cited by examiner

Primary Examiner — Ajit Patel
Assistant Examiner — Timothy Pham
(74) Attorney, Agent, or Firm — Locke Lord LLP

(57) ABSTRACT

A system for managing the simultaneous operation of a plurality of radio modems in a single wireless communication device (WCD). The multiradio control may be integrated into the WCD as a subsystem responsible for scheduling wireless communications by temporarily enabling or disabling the plurality of radio modems within the device. The multiradio control system may comprise a multiradio controller (MRC) and a plurality dedicated radio interfaces. Further, clock synchronization protection between the multiradio system controller, other modems and wireless communication devices with whom the wireless device is communicating may further be implemented as a protective measure to ensure a valid clock synchronization between all devices internal and external to the primary wireless device.

35 Claims, 21 Drawing Sheets

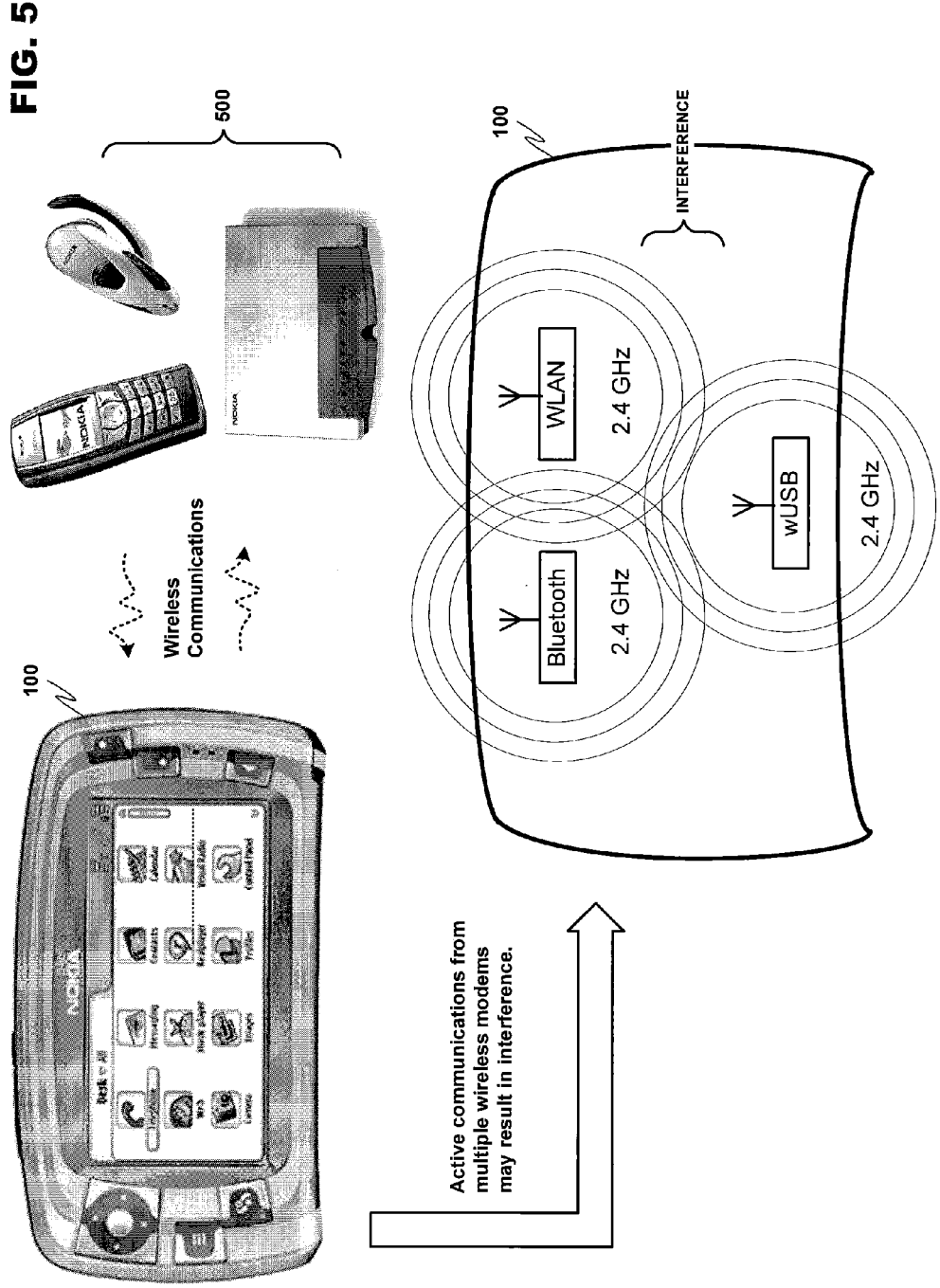

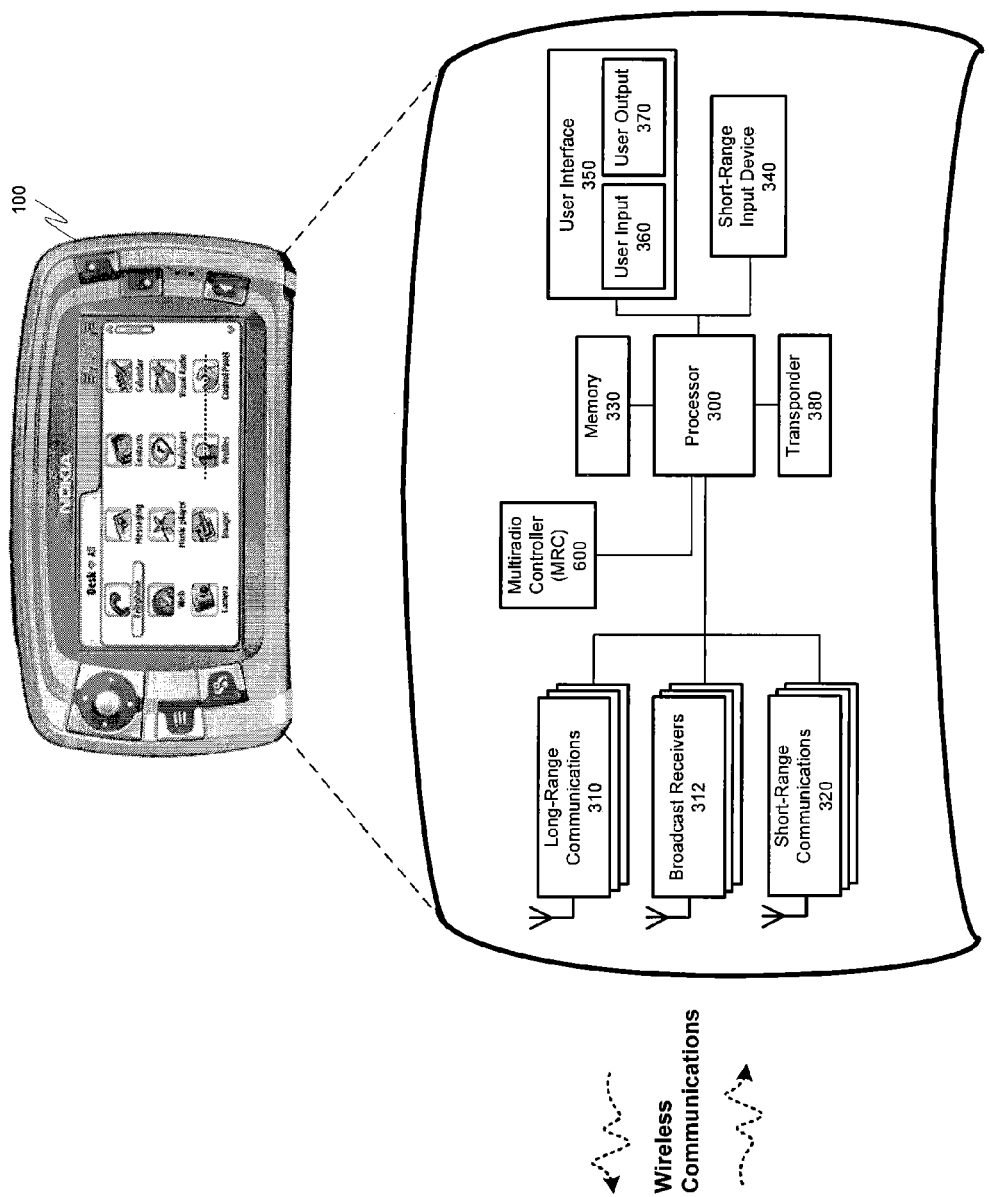

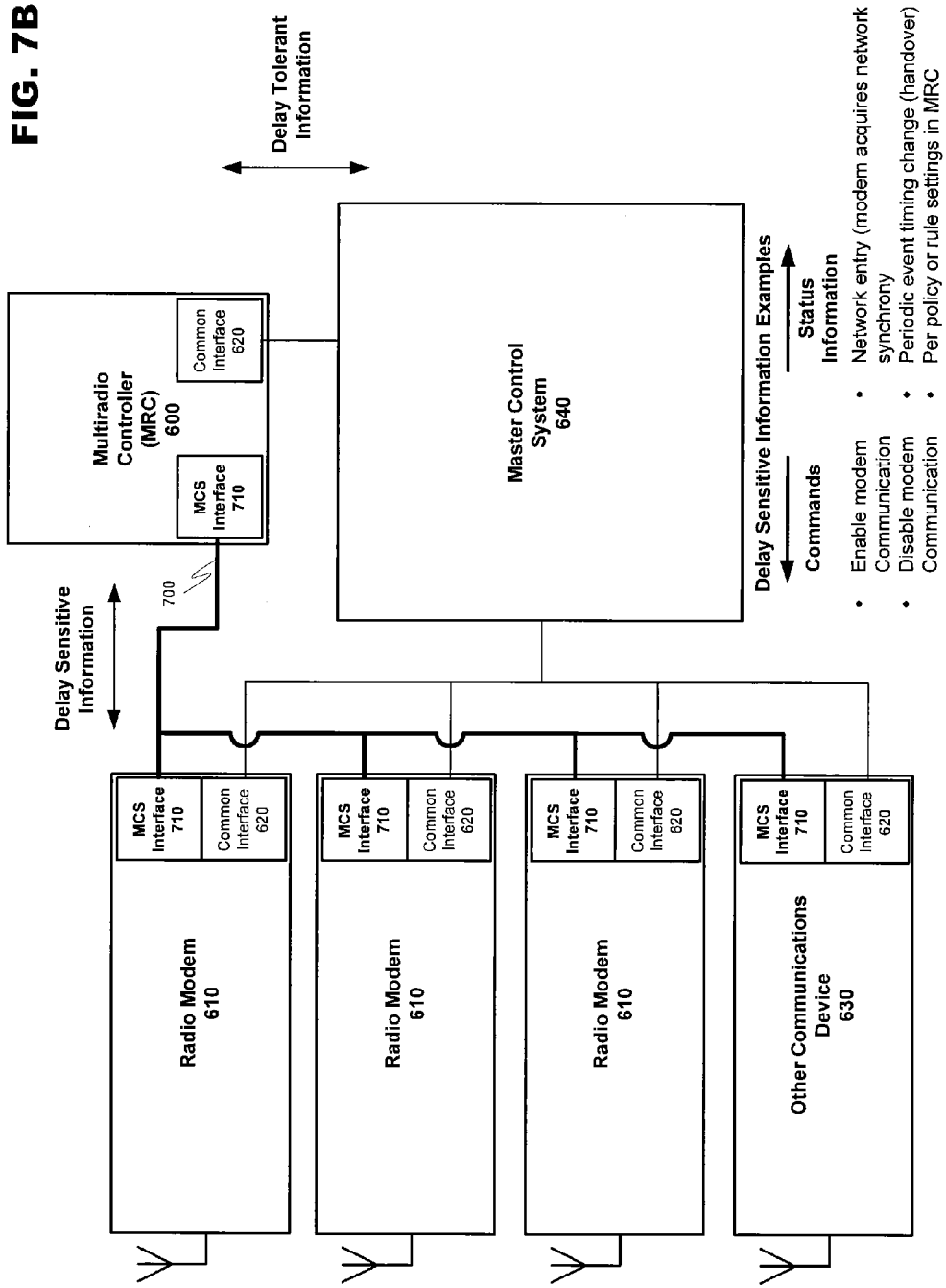

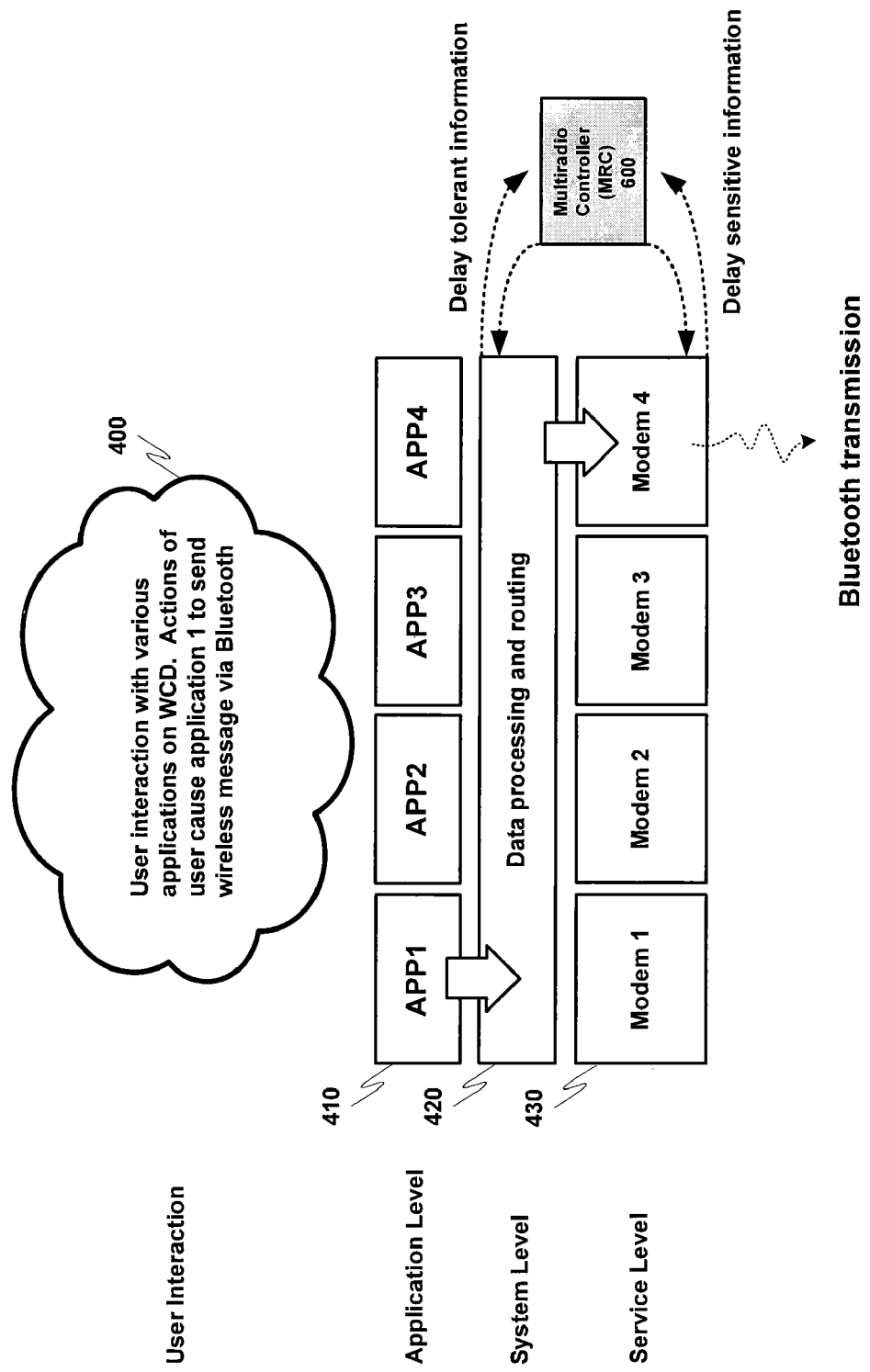

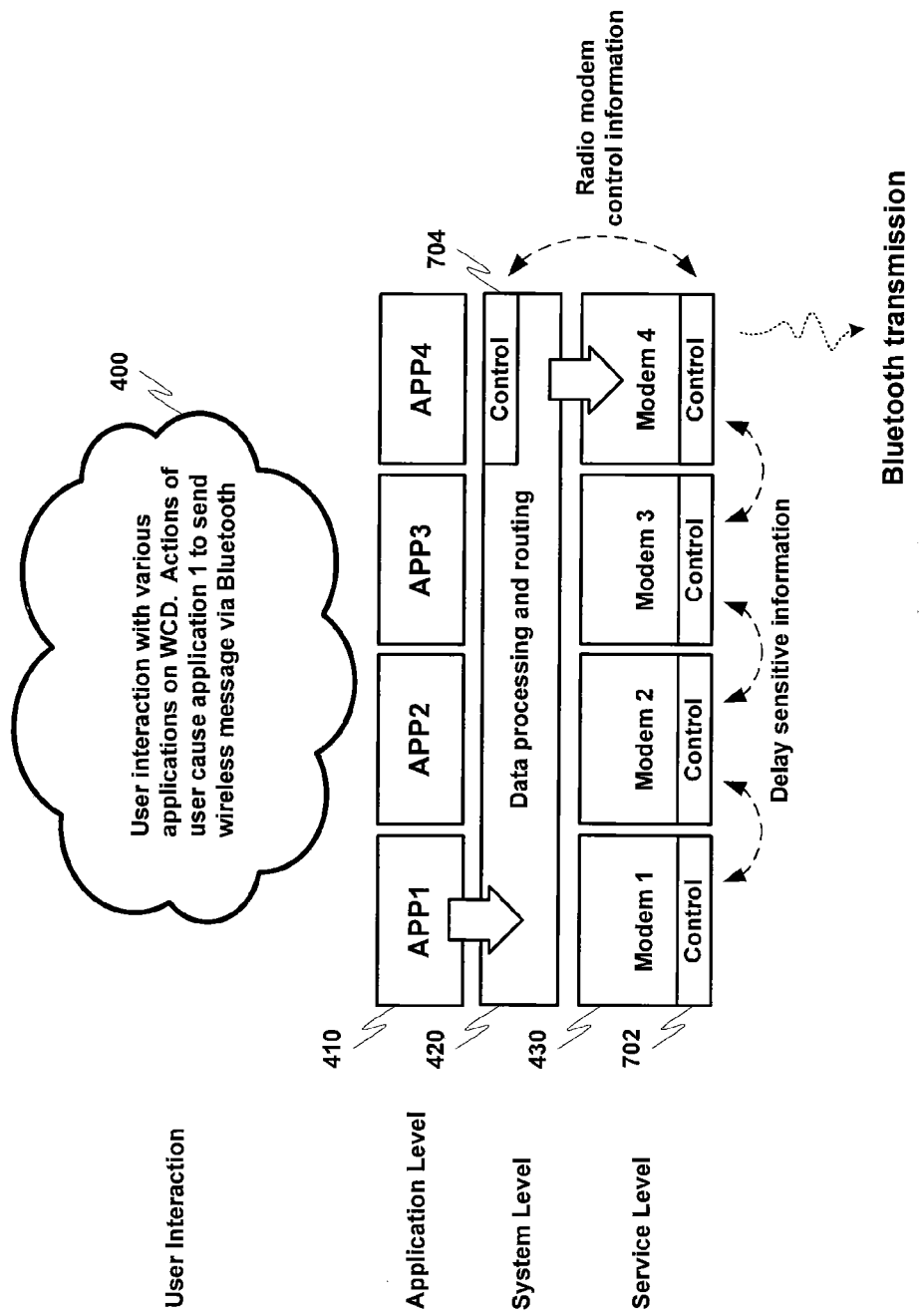

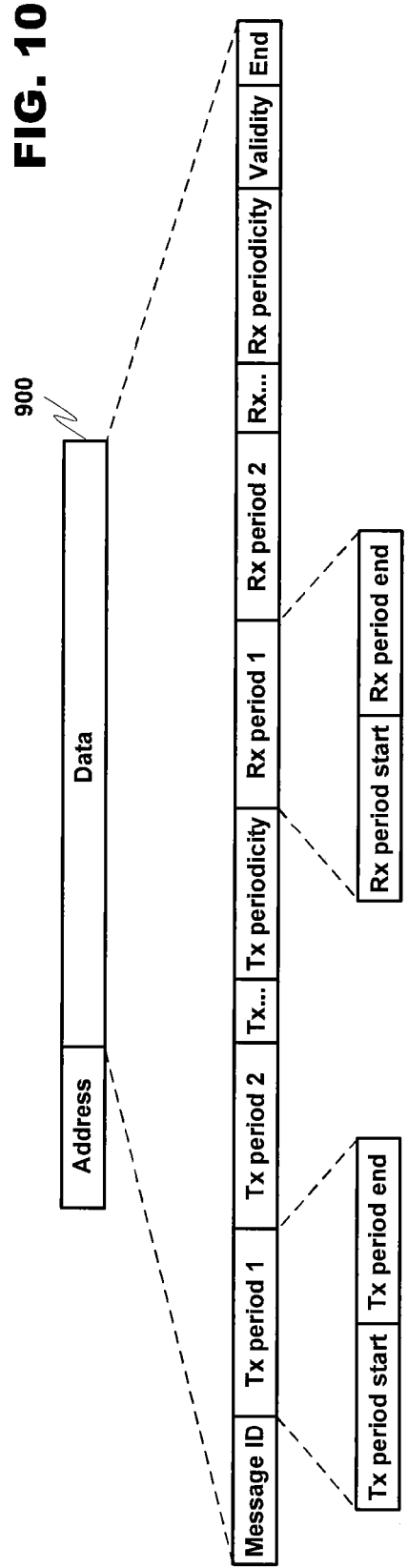

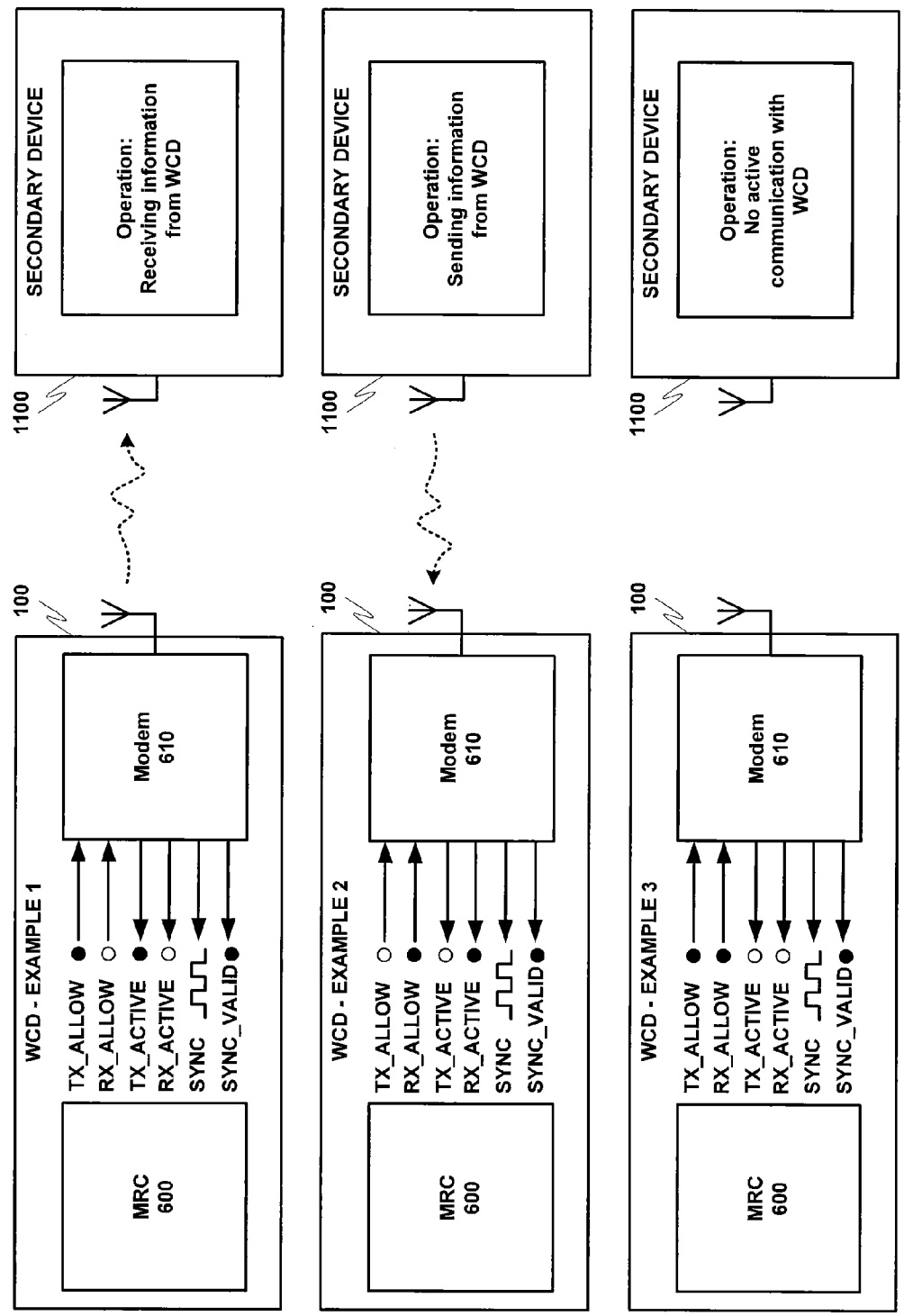

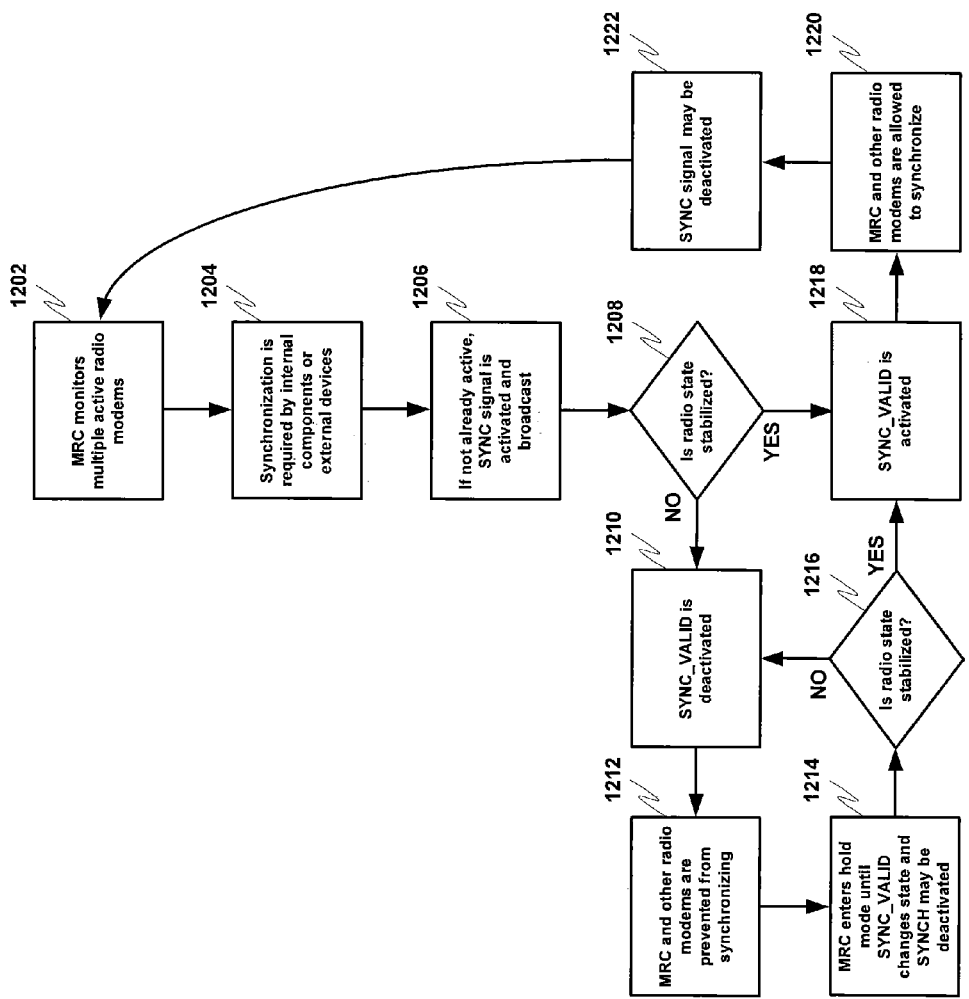

MULTIRADIO SCHEDULING INCLUDING CLOCK SYNCHRONIZATION VALIDITY PROTECTION

BACKGROUND OF INVENTION

1. Field of Invention

The present invention relates to a system for managing multiple radio modems imbedded in a wireless communication device, and more specifically, to a multiradio control system for scheduling a plurality of active radio modems, and further providing information to system components and/or wireless devices regarding radio modem synchronization.

2. Description of Prior Art

Modem society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communications, to modem digital cellular telephones. GSM is an example of a widely employed 2G digital cellular network communicating in the 900 MHZ/1.8 GHZ bands in Europe and at 850 MHz and 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A Bluetooth™ enabled WCD transmits and receives data at a rate of 720 Kbps within a range of 10 meters, and may transmit up to 100 meters with additional power boosting. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), and UHF RFID. All of these wireless mediums have features and advantages that make them appropriate for various applications.

More recently, manufacturers have also begun to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

Device manufacturers are continuing to incorporate as many of the previously indicated exemplary communication features as possible into wireless communication devices in an attempt to bring powerful, "do-all" devices to market. Devices incorporating long-range, short-range and machine readable communication resources also often include multiple mediums for each category. This allows a communication device to flexibly adjust to its surroundings, for example, communicating both with a WLAN access point and a Bluetooth™ communication accessory, possibly at the same time.

Given the large array communications options compiled into one device, it is foreseeable that a user will want to employ a WCD to its full potential when replacing other productivity related devices. For example, a user may use a high powered WCD to replace other traditional, more cumbersome phones, computers, etc. In these situations, a WCD may be communicating simultaneously over numerous different wireless mediums. A user may use multiple peripheral Bluetooth™ devices (e.g., a headset and a keyboard) while having a voice conversation over GSM and interacting with a WLAN access point in order to access an Internet website. Problems may occur when these simultaneous communications cause interference with each other. Even if a communication medium does not have an identical operating frequency as another medium, a radio modem may cause extraneous interference to another medium. Further, it is also possible for the combined effects of two or more simultaneously operating radios to create intermodulation effects to another bandwidth due to harmonic effects. These disturbances may cause errors resulting in the required retransmission of lost packets, and the overall degradation of performance for one or more communication mediums.

The utility of a communication device equipped with the ability to communicate over multiple wireless communication mediums is greatly hindered if these communications can only be employed one at a time. Therefore, what is needed is a system to manage these various communication mediums so that they can function simultaneously with a negligible impact in performance. The system should be able to identify and understand the functionality of each wireless medium, and should be able to quickly react on changing conditions in the environment and control each medium so that interference is minimized.

SUMMARY OF INVENTION

The present invention includes a device, method, multiradio controller and computer program product for controlling the simultaneous operation of a plurality of radio modems embedded in the same wireless communication device. The operations of these radio modems may be directly controlled by a multiradio control system also integrated into the same wireless device. Clock synchronization protection between the multiradio system controller, other modems and wireless communication devices with whom the wireless device is communicating may further be implemented as a protective measure to ensure a valid clock synchronization between all devices internal and external to the primary wireless device.

The multiradio control system (MCS) may include at least one multiradio controller (MRC). The MRC may be a monolithic component, or alternatively, may be distributed amongst other components such as radio modems, and may communicate with each radio modem through either a communication interface common to the general control system of the WCD (common interface), or alternatively, it may utilize a specialized interface dedicated to transactions of the multiradio control system (MCS interface). While the common interface may be used to convey information between the MRC and the radio modems, it may suffer from communication delays due to traffic in the master control system (e.g., traffic from multiple running applications, user interactions, etc.). However, the MCS interfaces directly couple the MRC and communication resources of the WCD, and may allow the quick transmission of delay sensitive operational information and control commands regardless of ordinary master control system traffic. Delay sensitive information may be requested by the MRC, or may be provided by one or more of the plurality of radio modems if a change occurs during operation.

The MRC may use both delay tolerant information received from the common interface system, and delay sensitive information received, in some cases, from the dedicated MCS interface system to control overall communications for the WCD. The MRC monitors active wireless communications to determine if a potential conflict exists. In order to avoid a conflict, the MRC may schedule modems by directly enabling or disabling them for time periods through commands issued to these radio modems. While any or all of these commands may be sent through the common interface system, the MCS interface system, which is dedicated only to conveying delay-sensitive information, may provide a direct route between the MRC and the radio modems that is immune from any communication overhead caused by other transactions in the master control system.

Further, as a part of the overall MRC control strategy, the MRC and other wireless communication components/devices may be synchronized to various radio modems. Synchronization may align the MRC and other devices to the clock of a particular radio modem. In certain cases, the clock of a radio modem may be in invalid due to, for example, a mode or network change. In these cases, further protection against synchronizing to an invalid clock signal is employed to delay synchronization until a valid (stable) signal is available to sample.

DESCRIPTION OF DRAWINGS

The invention will be further understood from the following detailed description of a preferred embodiment, taken in conjunction with appended drawings, in which:

FIG. 5 discloses an operational example wherein interference occurs when utilizing multiple radio modems simultaneously within the same wireless communication device.

FIG. 6A discloses an exemplary structural description of a wireless communication device including a multiradio controller in accordance with at least one embodiment of the present invention.

FIG. 7B discloses a more detailed structural diagram of FIG. 7A including the multiradio control system and the radio modems.

FIG. 7C discloses an exemplary operational description of a wireless communication device including a multiradio control system in accordance with at least one embodiment of the present invention.

FIG. 9C discloses an exemplary operational description of a wireless communication device including a distributed multiradio control system in accordance with the alternative embodiment of the present invention disclosed in FIG. 9A.

FIG. 10 discloses an exemplary information packet usable with at least one embodiment of the present invention.

FIG. 11A discloses an exemplary communication interface corresponding to the status of a radio modem in accordance with at least one embodiment of the present invention.

FIG. 12 discloses a flowchart explaining an exemplary process by which a multiradio controller is informed of an invalid synchronization state in accordance with at least one embodiment of an instant invention.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks.

Figure 1:
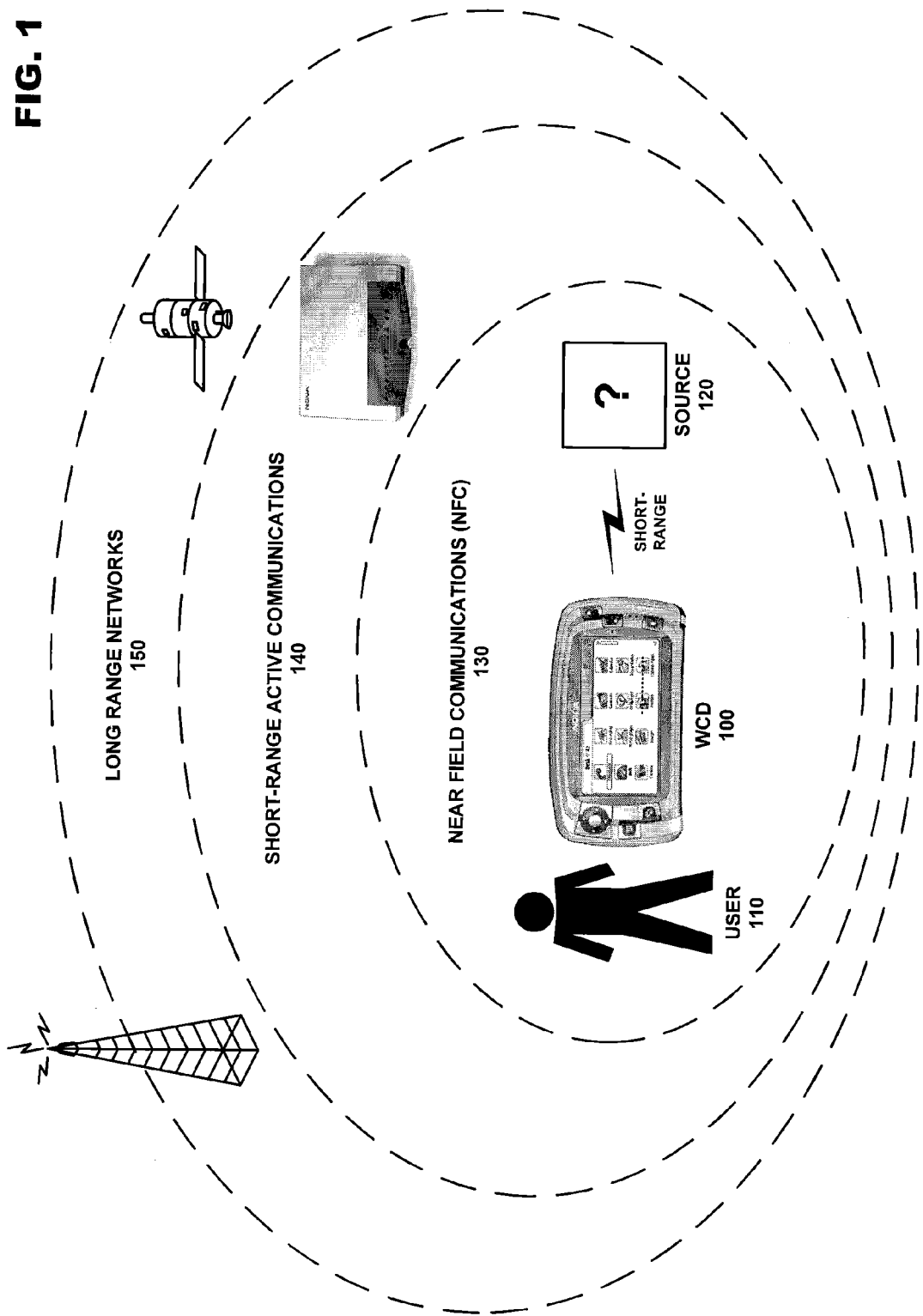
FIG. 1 discloses an exemplary wireless operational environment, including wireless communication mediums of different effective range.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communications (NFC) 130 include various transponder-type interactions wherein normally only the scanning device requires its own power source. WCD 100 scans source 120 via short-range communications. A transponder in source 120 may use the energy and/or clock signal contained within the scanning signal, as in the case of RFID communication, to respond with data stored in the transponder. These types of technologies usually have an effective transmission range on the order of ten feet, and may be able to deliver stored data in amounts from 96 bits to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communications. Short-range active communications 140 includes applications wherein the sending and receiving devices are both active. An exemplary situation would include user 110 coming within effective transmission range of a Bluetooth™, WLAN, UWB, WUSB, etc. access point. The amount of information to be conveyed is unlimited, except that it must all be transferred in the time when user 110 is within effective transmission range of the access point. This duration is extremely limited if the user is, for example, strolling through a shopping mall or walking down a street. Due to the higher complexity of these wireless networks, additional time is also required to establish the initial connection to WCD 100, which may be increased if there are many devices queued for service in the area proximate to the access point. The effective transmission range of these networks depends on the technology, and may be from 32 ft. to over 300 ft.

Long-range networks 150 are used to provide virtually uninterrupted communication coverage for WCD 100. Land-based radio stations or satellites are used to relay various communications transactions worldwide. While these systems are extremely functional, the use of these systems are often charged on a per-minute basis to user 110, not including additional charges for data transfer (e.g., wireless Internet access). Further, the regulations covering these systems cause additional overhead for both the users and providers, making the use of these systems more cumbersome.

In view of the above, it becomes easy to understand the need for a variety of different communication resources combined into a single WCD. Since these types of devices are being used as replacements for a variety of conventional communications means, including land-land telephones, low-functionality cellular handsets, laptops enabled with wireless communications, etc., the devices must be able to easily adapt to a variety of different applications (e.g., voice communications, business programs, GPS, Internet communications, etc.) in a variety of different environments (e.g. office, automobile, outdoors, arenas, shops, etc.)

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
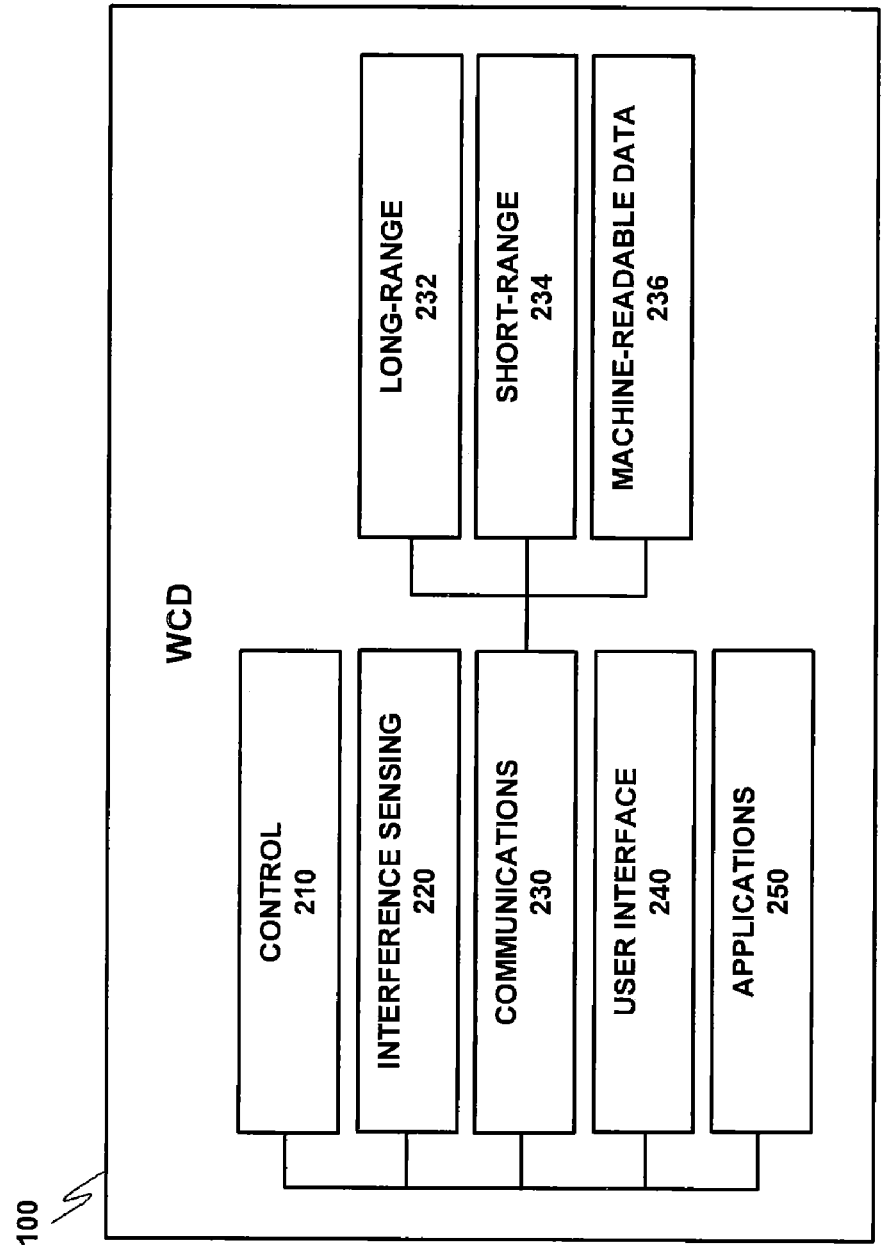
FIG. 2 discloses a modular description of an exemplary wireless communication device usable with at least one embodiment of the present invention.

FIG. 2 discloses an exemplary modular layout for a wireless communication device in accordance with at least one embodiment of the present invention. In FIG. 2, WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communications aspects of WCD 100. As shown in FIG. 2, communications module 230 may include, for example, long-range communications module 232, short-range communications module 234 and machine-readable data module 236 (e.g., for NFC). Communications module 230 utilizes at least these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
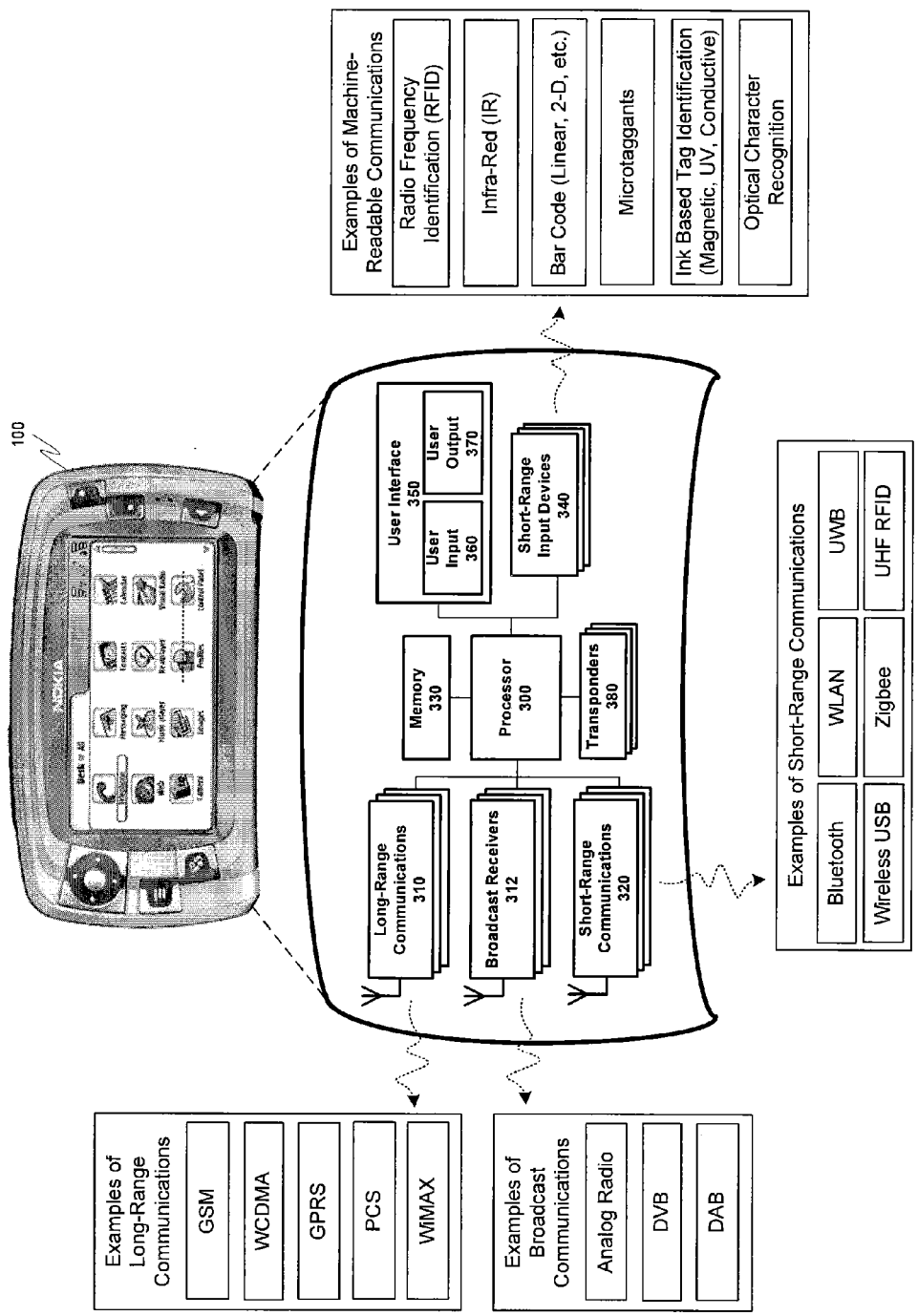
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to communications sections 310, 312, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 312, 320 and 340. Memory 330 may also store software components including a firewall, a service guide manager, a bookmark database, user interface manager, and any communications utilities modules required to support WCD 100.

Long-range communications 310 performs functions related to the exchange of information over large geographic areas (such as cellular networks) via an antenna. These communication methods include technologies from the previously described 1G to 3G. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages. As disclosed in FIG. 3, Long-range communications 310 may be composed of one or more subsystems supporting various long-range communications mediums. These subsystems may, for example, be radio modems enabled for various types of long-range wireless communication.

As a subset of long-range communications 310, or alternatively operating as an independent module separately connected to processor 300, broadcast receivers 312 allows WCD 100 to receive transmission messages via mediums such as Analog Radio, Digital Video Broadcast for Handheld Devices (DVB-H), Digital Audio Broadcasting (DAB), etc. These transmissions may be encoded so that only certain designated receiving devices may access the transmission content, and may contain text, audio or video information. In at least one example, WCD 100 may receive these transmissions and use information contained within the transmission signal to determine if the device is permitted to view the received content. As in the case of long-range communications 310, broadcast receivers 312 may be comprised of one or more radio modems utilized to receive a variety of broadcast information.

Short-range communications 320 is responsible for functions involving the exchange of information across short-range wireless networks. As described above and depicted in FIG. 3, examples of such short-range communications 320 are not limited to Bluetooth™, WLAN, UWB, Zigbee, UHF RFID, and Wireless USB connections. Accordingly, short-range communications 320 performs functions related to the establishment of short-range connections, as well as processing related to the transmission and reception of information via such connections. Short-range communications 320 may be composed of one or more subsystems made up of, for example, various radio modems employed to communicate via the previously indicated assortment of short range wireless mediums.

Short-range input device 340, also depicted in FIG. 3, may provide functionality related to the short-range scanning of machine-readable data (e.g., for NFC). For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (including processes related to interpreting UPC labels), and optical character recognition devices for reading magnetic, UV, conductive or other types of coded data that may be provided in a tag using suitable ink. In order for the short-range input device 340 to scan the aforementioned types of machine-readable data, the input device may include a multitude of optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device that may be programmed by processor 300 with information to be delivered in response to a scan from an outside source. For example, an RFID scanner mounted in a entryway may continuously emit radio frequency waves. When a person with a device containing transponder 380 walks through the door, the transponder is energized and may respond with information identifying the device, the person, etc.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Protocol (WAP), Hypertext Markup Language (HTML) variants like Compact HTML (CHTML), etc.

III. Exemplary Operation of a Wireless Communication Device Including Potential Interference Problems Encountered.

Figure 4:
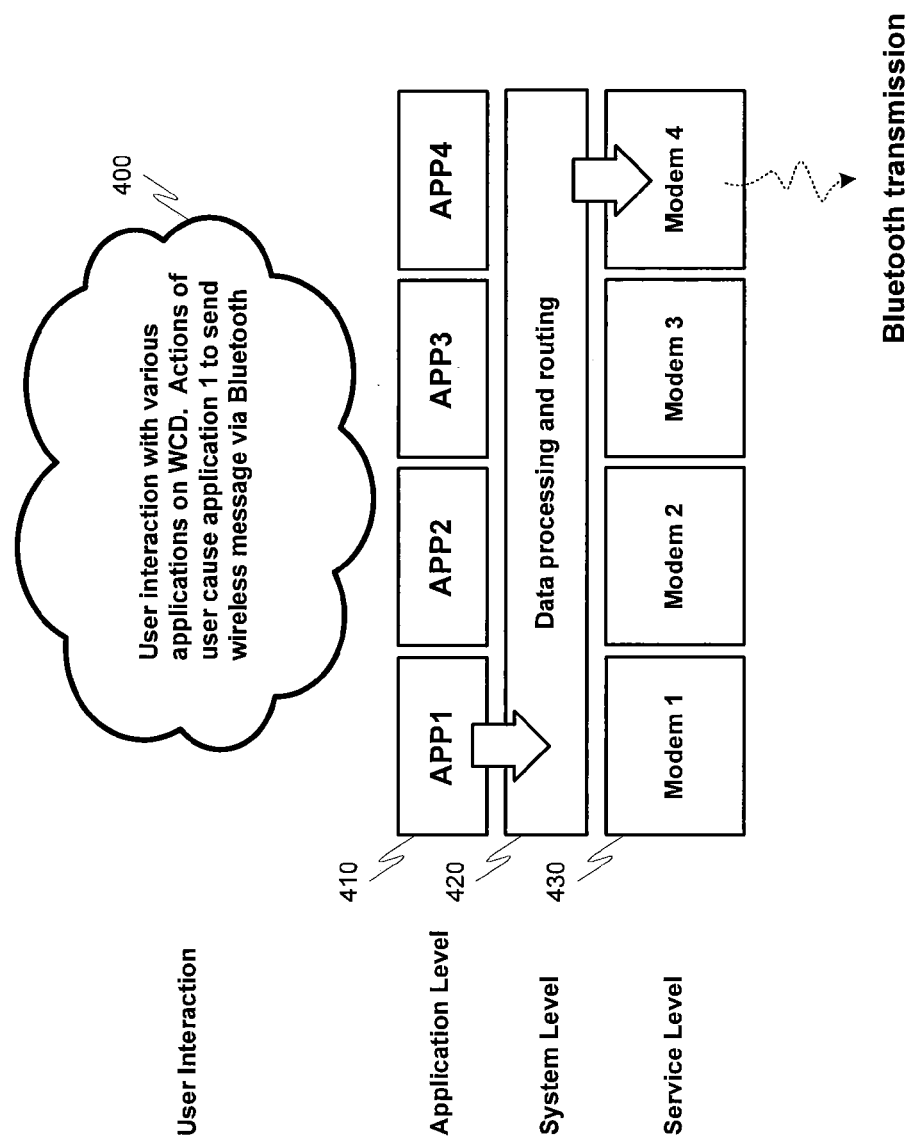
FIG. 4 discloses an exemplary operational description of a wireless communication device utilizing a wireless communication medium in accordance with at least one embodiment of the present invention.

FIG. 4 discloses a stack approach to understanding the operation of a WCD in accordance with at least one embodiment of the present invention. At the top level 400, user 110 interacts with WCD 100. The interaction involves user 110 entering information via user input 360 and receiving information from user output 370 in order to activate functionality in application level 410. In the application level, programs related to specific functionality within the device interact with both the user and the system level. These programs include applications for visual information (e.g., web browser, DVB-H receiver, etc.), audio information (e.g., cellular telephone, voice mail, conferencing software, DAB or analog radio receiver, etc.), recording information (e.g., digital photography software, word processing, scheduling, etc.) or other information processing. Actions initiated at application level 410 may require information to be sent from or received into WCD 100. In the example of FIG. 4, data is requested to be sent to a recipient device via Bluetooth™ communication. As a result, application level 410 may then call resources in the system level to initiate the required processing and routing of data.

System level 420 processes data requests and routes the data for transmission. Processing may include, for example, calculation, translation, conversion and/or packetizing the data. The information may then be routed to an appropriate communication resource in the service level. If the desired communication resource is active and available in the service level 430, the packets may be routed to a radio modem for delivery via wireless transmission. There may be a plurality of modems operating using different wireless mediums. For example, in FIG. 4, modem 4 is activated and able to send packets using Bluetooth™ communication. However, a radio modem (as a hardware resource) need not be dedicated only to a specific wireless medium, and may be used for different types of communication depending on the requirements of the wireless medium and the hardware characteristics of the radio modem.

FIG. 5 discloses a situation wherein the above described exemplary operational process may cause more than one radio modem to become active. In this case, WCD 100 is both transmitting and receiving information via wireless communication over a multitude of mediums. WCD 100 may be interacting with various secondary devices such as those grouped at 500. For example, these devices may include cellular handsets communicating via long-range wireless communication like GSM, wireless headsets communicating via Bluetooth™, Internet access points communicating via WLAN, etc.

Problems may occur when some or all of these communications are carried on simultaneously. As further shown in FIG. 5, multiple modems operating simultaneously may cause interference for each other. Such a situation may be encountered when WCD 100 is communicating with more than one external device (as previously described). In an exemplary extreme case, devices with modems simultaneously communicating via Bluetooth™, WLAN and wireless USB would encounter substantial overlap since all of these wireless mediums operate in the 2.4 GHz band. The interference, shown as an overlapping portion of the fields depicted in FIG. 5, would cause packets to be lost and the need for retransmission of these lost packets. Retransmission requires that future time slots be used to retransmit lost information, and therefore, overall communications performance will at least be reduced, if the signal is not lost completely. The present invention, in at least one embodiment, seeks to manage such situations where communications are occurring simultaneously so that anticipated interference is minimized or totally avoided, and as a result, both speed and quality are maximized.

IV. A Wireless Communication Device Including a Multiradio Controller.

In an attempt to better manage communications in WCD 100, an additional controller dedicated to managing wireless communications may be introduced. WCD 100, as pictured in FIG. 6A, includes a multiradio controller (MRC) 600 in accordance with at least one embodiment of the present invention. MRC 600 is coupled to the master control system of WCD 100. This coupling enables MRC 600 to communicate with radio modems or other similar devices in communications modules 310 312, 320 and 340 via the master operating system of WCD 100. While this configuration may in some cases improve overall wireless communications efficiency for WCD 100, problems may occur when WCD 100 becomes busy (e.g., when the control system of WCD 100 is employed in multitasking many different simultaneous operations, both communications and non-communications related).

Figure 6B:
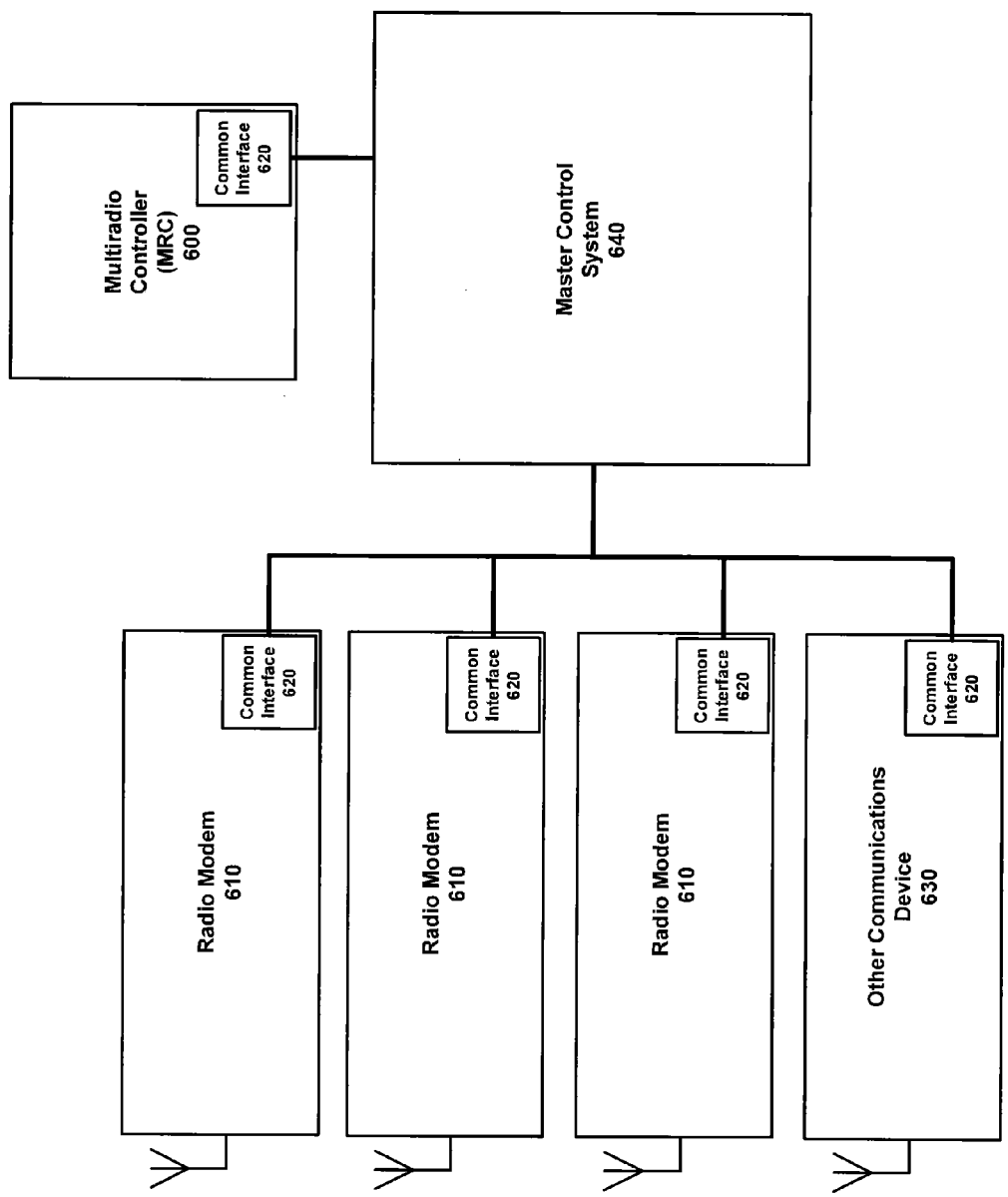
FIG. 6B discloses a more detailed structural diagram of FIG. 6A including the multiradio controller and the radio modems.

FIG. 6B discloses in detail at least one embodiment of WCD 100, which may include multiradio controller (MRC) 600 introduced in FIG. 6A in accordance with at least one embodiment of the present invention. MRC 600 includes common interface 620 by which information may be sent or received through master control system 640. Further, each radio modem 610 or similar communication device 630, for example an RFID scanner for scanning machine-readable information, may also include some sort of common interface 620 for communicating with master control system 640. As a result, all information, commands, etc. occurring between radio modems 610, similar devices 630 and MRC 600 are conveyed by the communications resources of master control system 640. The possible effect of sharing communications resources with all the other functional modules within WCD 100 will be discussed with respect to FIG. 6C.

Figure 6C:
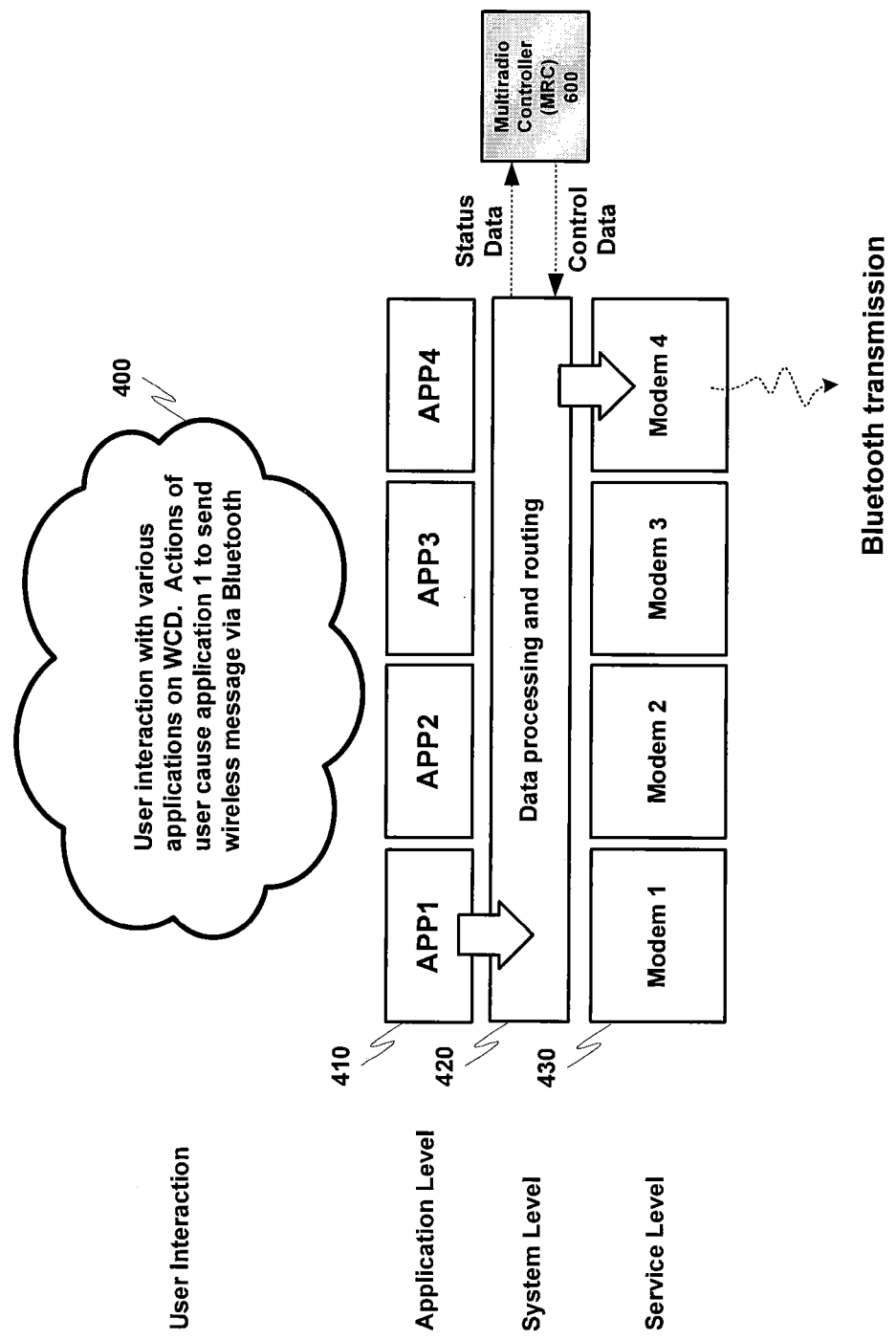
FIG. 6C discloses an exemplary operational description of a wireless communication device including a multiradio controller in accordance with at least one embodiment of the present invention.

FIG. 6C discloses an operational diagram similar to FIG. 4 including the effect of MRC 600 in accordance with at least one embodiment of the present invention. In this system MRC 600 may receive operational data from the master operating system of WCD 100, concerning for example applications running in application level 410, and status data from the various radio communication devices in service level 430. MRC 600 may use this information to issue scheduling commands to the communication devices in service level 430 in an attempt to avoid communication problems. However, problems may occur when the operations of WCD 100 are fully employed. Since the various applications in application level 410, the operating system in system level 420, the communications devices in service level 430 and MRC 600 must all share the same communications system, delays may occur when all aspects of WCD 100 are trying to communicate on the common interface system 620. As a result, delay sensitive information regarding both communication resource status information and radio modem 610 control information may become delayed, nullifying any beneficial effect from MRC 600. Therefore, a system better able to handle the differentiation and routing of delay sensitive information is required if the beneficial effect of MRC 600 is to be realized.

V. A Wireless Communication Device Including a Multiradio Control System.

Figure 7A:
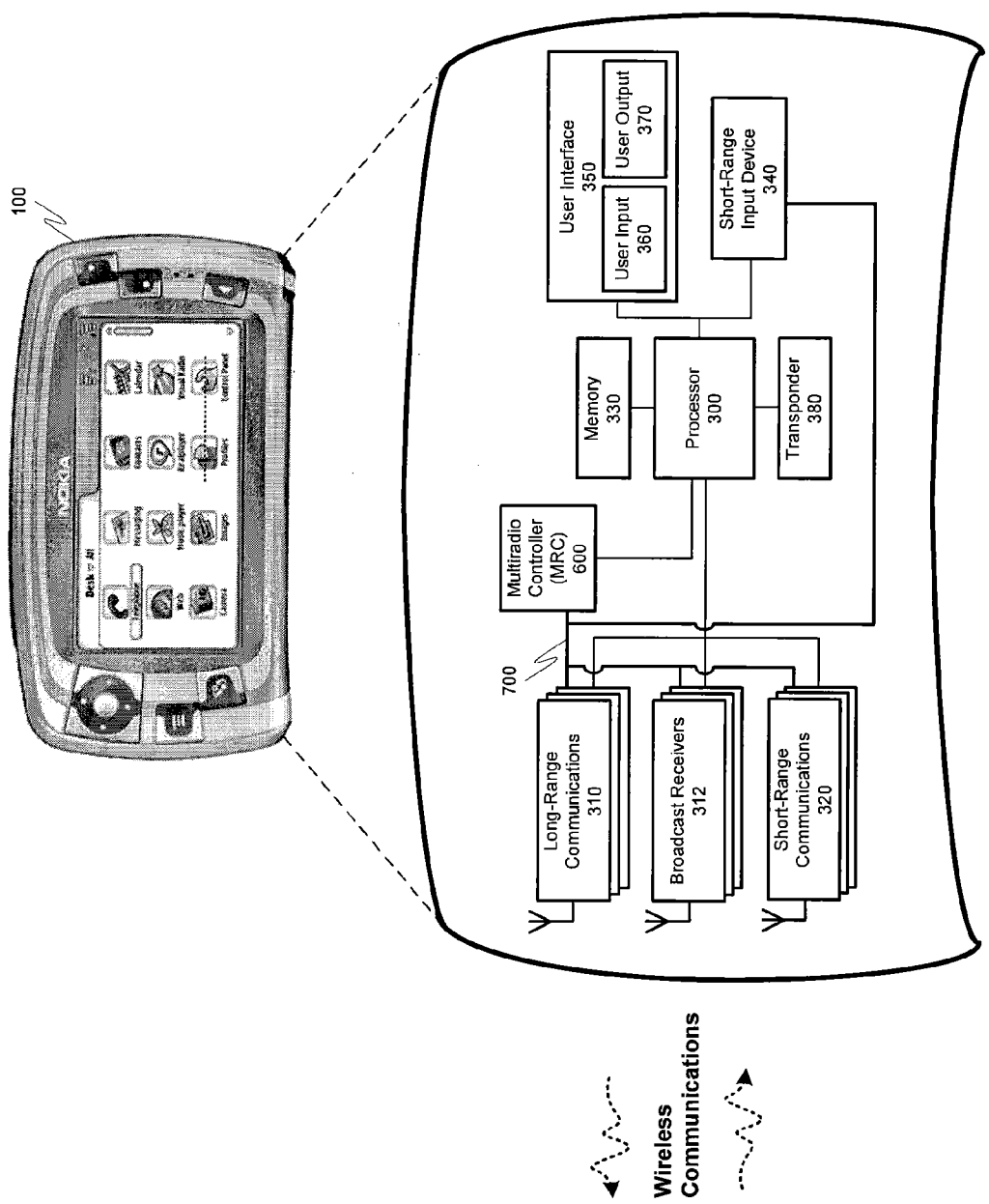
FIG. 7A discloses an exemplary structural description of a wireless communication device including a multiradio control system in accordance with at least one embodiment of the present invention.

FIG. 7A introduces MRC 600 as part of a multiradio control system (MCS) 700 in WCD 100 in accordance with at least one embodiment of the present invention. MCS 700 directly links the communications resources of modules 310, 312, 320 and 340 to MRC 600. MCS 700 may provide a dedicated low-traffic communication structure for carrying delay sensitive information both to and from MRC 600.

Additional detail is shown in FIG. 7B. MCS 700 forms a direct link between MRC 600 and the communication resources of WCD 100. This link may be established by a system of dedicated MCS interfaces 710 and 720. For example, MCS interface 720 may be coupled to MRC 600. MCS Interfaces 710 may connect radio modems 610 and other similar communications devices 630 to MCS 700 in order to form an information conveyance for allowing delay sensitive information to travel to and from MRC 600. In this way, the abilities of MRC 600 are no longer influenced by the processing load of master control system 640. As a result, any information still communicated by master control system 640 to and from MRC 600 may be deemed delay tolerant, and therefore, the actual arrival time of this information does not substantially influence system performance. On the other hand, all delay sensitive information is directed to MCS 700, and therefore is insulated from the loading of the master control system.

The effect of MCS 700 is seen in FIG. 7C in accordance with at least one embodiment of the present invention. Information may now be received in MRC 600 from at least two sources. System level 420 may continue to provide information to MRC 600 through master control system 640. In addition, service level 430 may specifically provide delay sensitive information conveyed by MCS 700. MRC 600 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information includes at least modem operational information that frequently changes during the course of a wireless connection, and therefore, requires immediate update. As a result, delay sensitive information may need to be delivered directly from the plurality of radio modems 610 through the MCS interfaces 710 and 720 to MRC 600, and may include radio modem synchronization information. Delay sensitive information may be provided in response to a request by MRC 600, or may be delivered as a result of a change in radio modem settings during transmission, as will be discussed with respect to synchronization below.

VI. A Wireless Communication Device Including a Distributed Multiradio Control System.

Figure 8A:
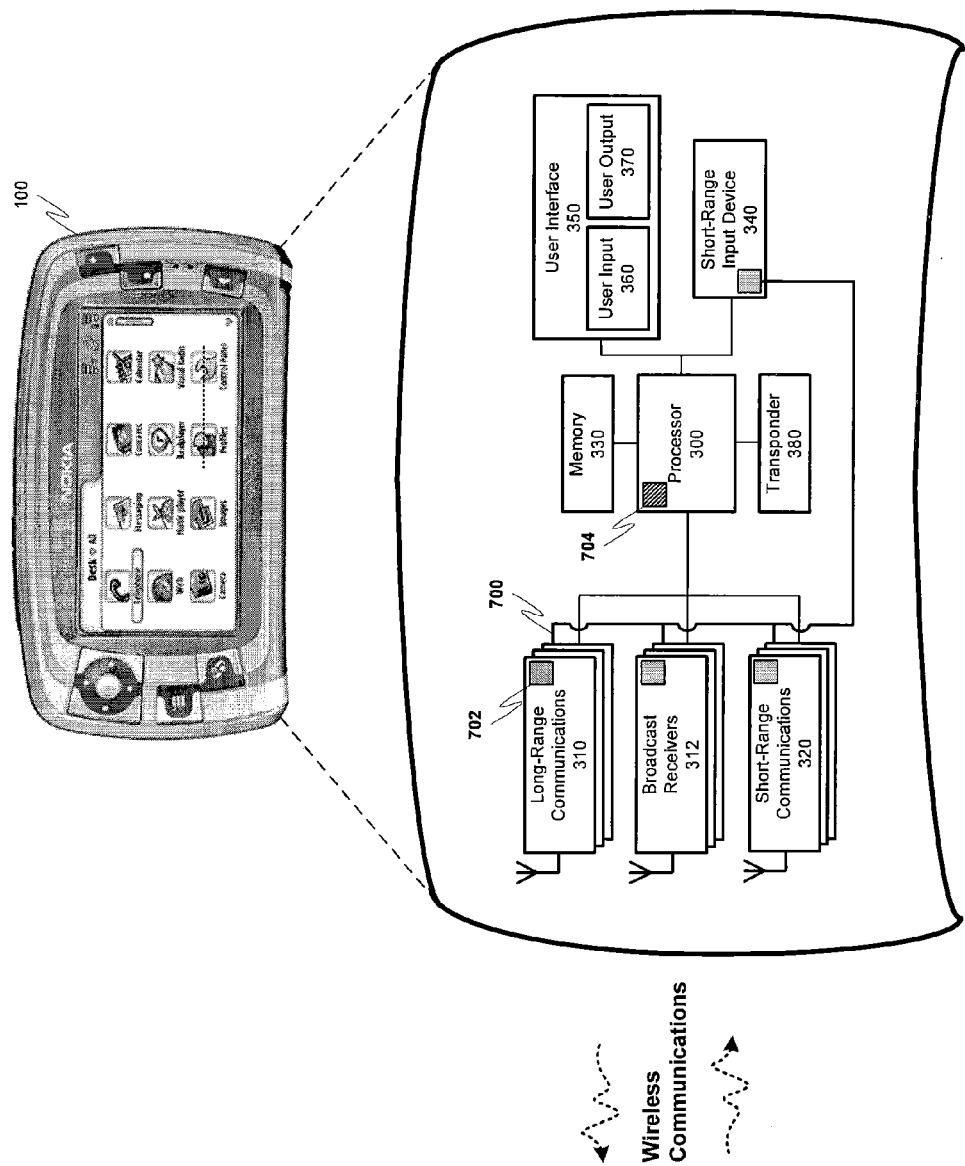
FIG. 8A discloses an exemplary structural description of a wireless communication device including a distributed multiradio control system in accordance with at least one embodiment of the present invention.

FIG. 8A discloses an alternative configuration in accordance with at least one embodiment of the present invention, wherein a distributed multiradio control system (MCS) 700 is introduced into WCD 100. Distributed MCS 700 may, in some cases, be deemed to provide an advantage over a centralized MRC 600 by distributing these control features into already necessary components within WCD 100. As a result, a substantial amount of the communication management operations may be localized to the various communication resources, such as radio modems 610, reducing the overall amount of control command traffic in WCD 100.

MCS 700, in this example, may be implemented utilizing a variety of bus structures, including the $I^2C$ interface commonly found in portable electronic devices, as well as emerging standards such as SLIMbus that are now under development. $I^2C$ is a multi-master bus, wherein multiple devices can be connected to the same bus and each one can act as a master through initiating a data transfer. An $I^2C$ bus contains at least two communication lines, an information line and a clock line. When a device has information to transmit, it assumes a master role and transmits both its clock signal and information to a recipient device. SLIMbus, on the other hand, utilizes a separate, non-differential physical layer that runs at rates of 50 Mbits/s or slower over just one lane. It is being developed by the Mobile Industry Processor Interface (MIPI) Alliance to replace today's $I^2C$ and $I^2S$ interfaces while offering more features and requiring the same or less power than the two combined.

MCS 700 directly links distributed control components 702 in modules 310, 312, 320 and 340. Another distributed control component 704 may reside in master control system 640 of WCD 100. It is important to note that distributed control component 704 shown in processor 300 is not limited only to this embodiment, and may reside in any appropriate system module within WCD 100. The addition of MCS 700 provides a dedicated low-traffic communication structure for carrying delay sensitive information both to and from the various distributed control components 702.

Figure 8B:
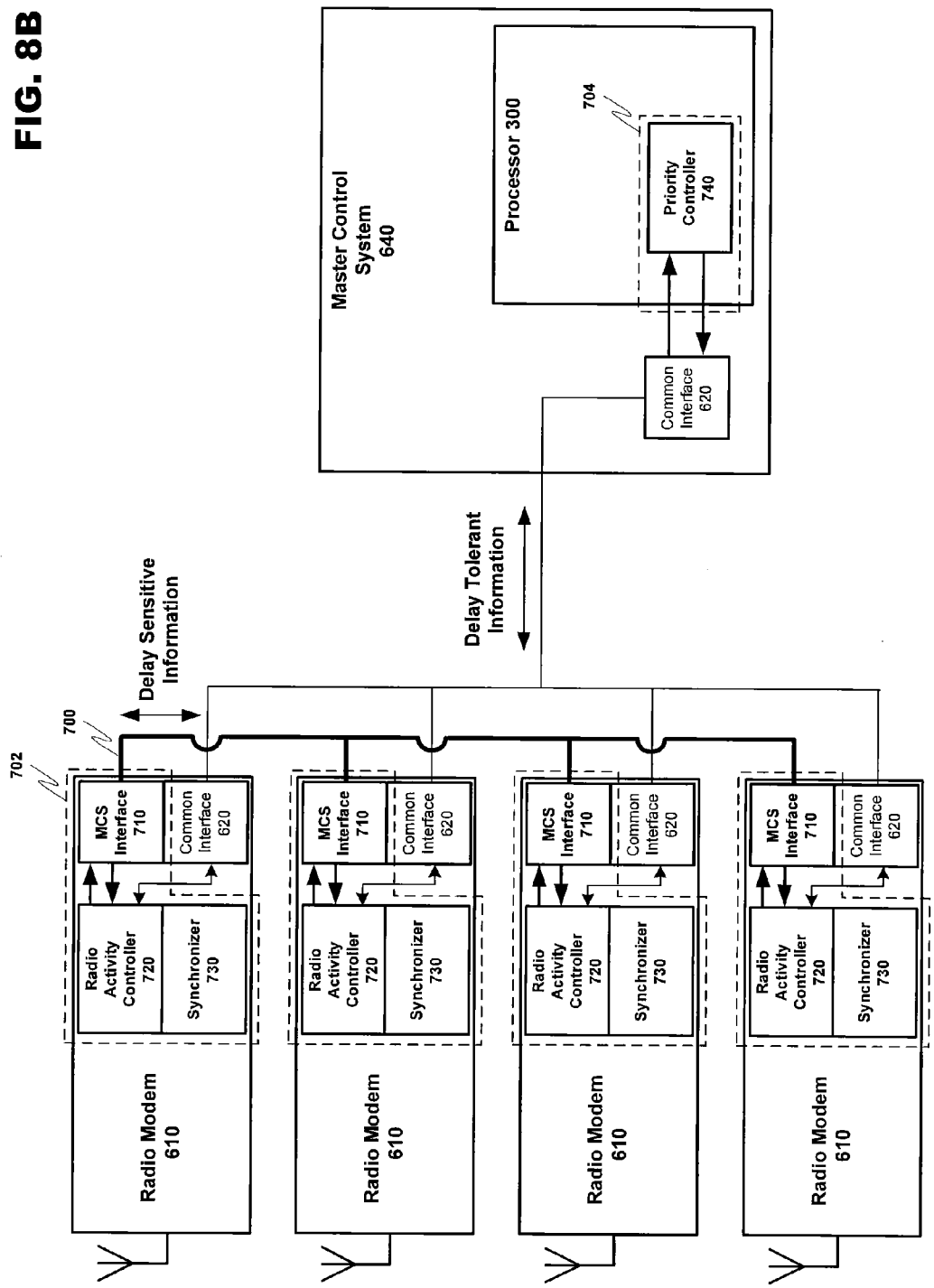
FIG. 8B discloses a more detailed structural diagram of FIG. 8A including the distributed multiradio control system and the radio modems.

The exemplary embodiment disclosed in FIG. 8A is described with more detail in FIG. 8B. MCS 700 forms a direct link between distributed control components 702 within WCD 100. Distributed control components 702 in radio modems 610 may, for example, consist of MCS interface 710, radio activity controller 720 and synchronizer 730. Radio activity controller 720 uses MCS interface 710 to communicate with distributed control components in other radio modems 610. Synchronizer 730 may be utilized to obtain timing information from radio modem 610 to satisfy synchronization requests from any of the distributed control components 702. Radio activity controller 702 may also obtain information from master control system 640 (e.g., from distributed control component 704) through common interface 620. As a result, any information communicated by master control system 640 to radio activity controller 720 through common interface 620 may be deemed delay tolerant, and therefore, the actual arrival time of this information does not substantially influence communication system performance. On the other hand, all delay sensitive information may be conveyed by MCS 700, and therefore is insulated from master control system overloading.

As previously stated, a distributed control component 704 may exist within master control system 640. Some aspects of this component may reside in processor 300 as, for example, a running software routine that monitors and coordinates the behavior of radio activity controllers 720. Processor 300 is shown to contain priority controller 740. Priority controller 740 may be utilized to monitor active radio modems 610 in order to determine priority amongst these devices. Priority may be determined by rules and/or conditions stored in priority controller 740. Modems that become active may request priority information from priority controller 740. Further, modems that go inactive may notify priority controller 740 so that the relative priority of the remaining active radio modems 610 may be adjusted accordingly. Priority information is usually not considered delay sensitive because it is mainly updated when radio modems 610 activate/deactivate, and therefore, does not frequently change during the course of an active communication connection in radio modems 610. As a result, this information may be conveyed to radio modems 610 using common interface system 620 in at least one embodiment of the present invention.

Figure 8C:
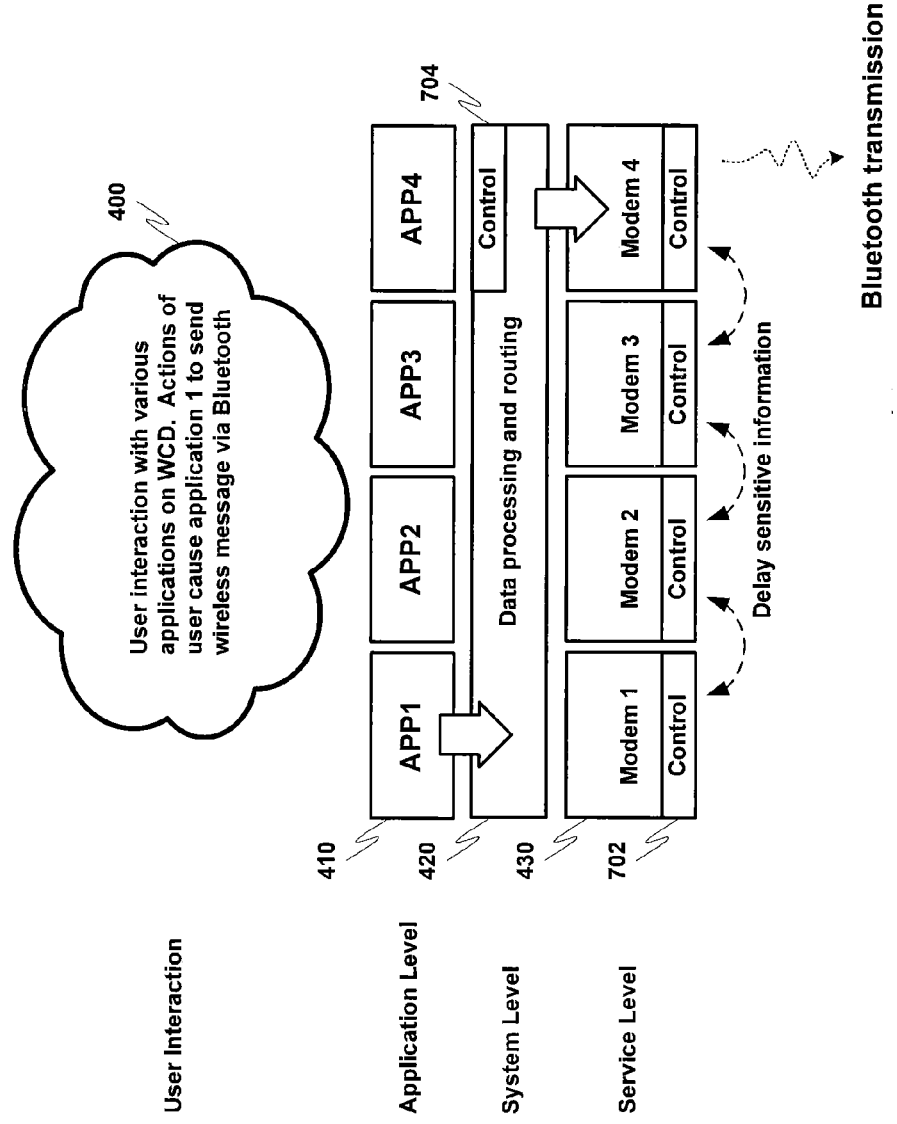
FIG. 8C discloses an exemplary operational description of a wireless communication device including a distributed multiradio control system in accordance with at least one embodiment of the present invention.

At least one effect of a distributed control MCS 700 is seen in FIG. 8C. System level 420 may continue to provide delay tolerant information to distributed control components 702 through master control system 640. In addition, distributed control components 702 in service level 430, such as modem activity controllers 720, may exchange delay sensitive information with each other via MCS 700. Each distributed control component 702 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information includes at least modem operational information that frequently changes during the course of a wireless connection, and therefore, requires immediate update. Delay sensitive information needs to be delivered directly between distributed control components 702, and may include radio modem synchronization and activity control information. Delay sensitive information may be provided in response to a request, or may be delivered as a result of a change in radio modem, which will be discussed with respect to synchronization below.

MCS interface 710 may be used to (1) Exchange synchronization information, and (2) Transmit identification or prioritization information between various radio activity controllers 720. In addition, as previously stated, MCS interface 710 is used to communicate the radio parameters that are delay sensitive from a controlling point of view. MCS interface 710 can be shared between different radio modems (multipoint) but it cannot be shared with any other functionality that could limit the usage of MCS interface 710 from a latency point of view.

The control signals sent on MCS 700 that may enable/disable a radio modem 610 should be built on a modem's periodic events. Each radio activity controller 720 may obtain this information about a radio modem's periodic events from synchronizer 730. This kind of event can be, for example, frame clock event in GSM (4.615 ms), slot clock event in BT (625 us) or targeted beacon transmission time in WLAN (100 ms) or any multiple of these. A radio modem 610 may send its synchronization indications when (1) Any radio activity controller 720 requests it, (2) a radio modem internal time reference is changed (e.g. due to handover or handoff). The latency requirement for the synchronization signal is not critical as long as the delay is constant within a few microseconds. The fixed delays can be taken into account in the scheduling logic of radio activity controller 710.

The radio modem activity control is based on the knowledge of when the active radio modems 610 are about to transmit (or receive) in the specific connection mode in which the radios are currently operating. The connection mode of each radio modem 610 may be mapped to the time domain operation in their respective radio activity controller 720. As an example, for a GSM speech connection, priority controller 740 may have knowledge about all traffic patterns of GSM. This information may be transferred to the appropriate radio activity controller 720 when radio modem 610 becomes active, which may then recognize that the speech connection in GSM includes one transmission slot of length 577 μs, followed by an empty slot after which is the reception slot of 577 μs, two empty slots, monitoring (RX on), two empty slots, and then it repeats. Dual transfer mode means two transmission slots, empty slot, reception slot, empty slot, monitoring and two empty slots. When all traffic patterns that are known a priori by the radio activity controller 720, it only needs to know when the transmission slot occurs in time to gain knowledge of when the GSM radio modem is active. This information may be obtained by synchronizer 730. When the active radio modem 610 is about to transmit (or receive) it must check every time whether the modem activity control signal from its respective radio activity controller 720 permits the communication. Radio activity controller 720 is always either allowing or disabling the transmission of one full radio transmission block (e.g. GSM slot).

VII. A Wireless Communication Device Including an Alternative Example of a Distributed Multiradio Control System.

Figure 9A:
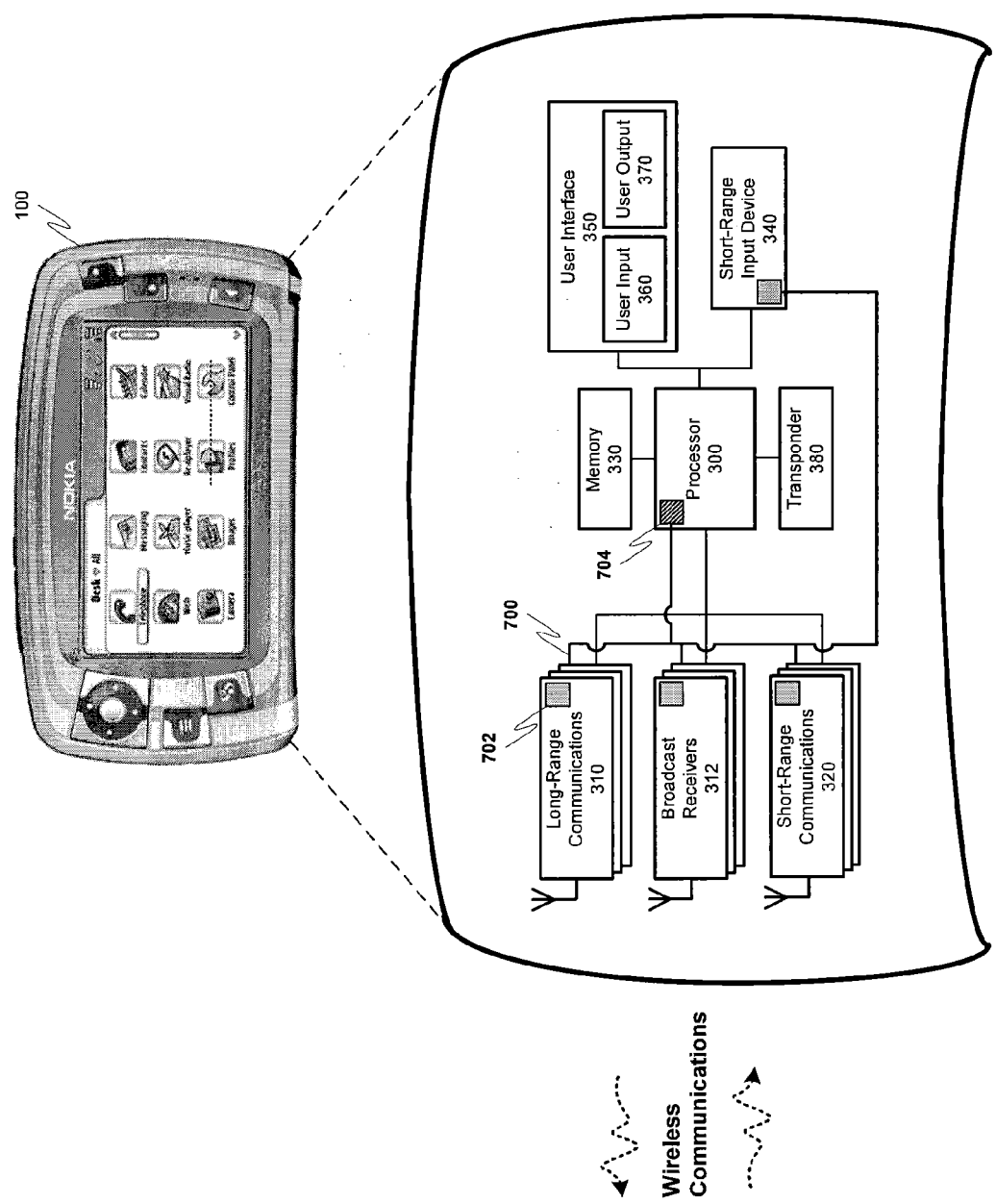
FIG. 9A discloses an exemplary structural description of a wireless communication device including a distributed multiradio control system in accordance with an alternative embodiment of the present invention.
Figure 9B:
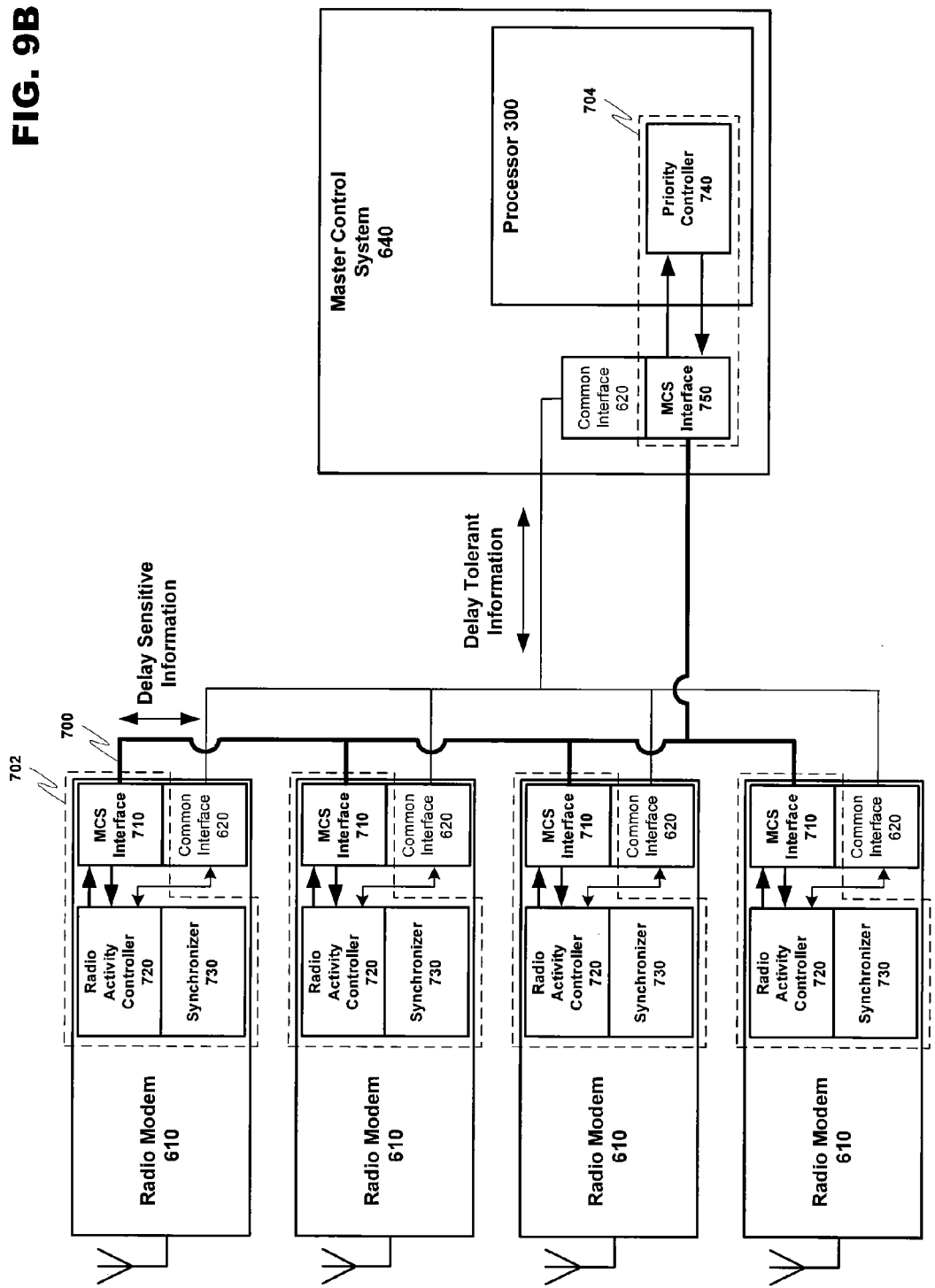
FIG. 9B discloses a more detailed structural diagram of FIG. 9A including the distributed multiradio control system and the radio modems.

An alternative distributed control configuration in accordance with at least one embodiment of the present invention is disclosed in FIG. 9A-9C. In FIG. 9A, distributed control components 702 continue to be linked by MCS 700. However, now distributed control component 704 is also directly coupled to distributed control components 702 via an MCS interface. As a result, distributed control component 704 may also utilize and benefit from MCS 700 for transactions involving the various communications components of WCD 100.

Referring now to FIG. 9B, the inclusion of distributed control component 704 onto MCS 700 is shown in more detail. Distributed control component 704 includes at least priority controller 740 coupled to MCS interface 750. MCS interface 750 allows priority controller 740 to send information to, and receive information from, radio activity controllers 720 via a low-traffic connection dedicated to the coordination of communication resources in WCD 100. As previously stated, the information provided by priority controller 740 may not be deemed delay sensitive information, however, the provision of priority information to radio activity controllers 720 via MCS 700 may improve the overall communication efficiency of WCD 100. Performance may improve because quicker communications between distributed control components 702 and 704 may result in faster relative priority resolution in radio activity controllers 720. Further, the common interface system 620 of WCD 100 will be relieved of having to accommodate communication traffic from distributed control component 704, reducing the overall communication load in master control system 640. Another benefit may be realized in communication control flexibility in WCD 100. New features may be introduced into priority controller 740 without worrying about whether the messaging between control components will be delay tolerant or sensitive because an MCS interface 710 is already available at this location.

FIG. 9C discloses the operational effect of the enhancements seen in the current alternative embodiment of the present invention on communications in WCD 100. The addition of an alternative route for radio modem control information to flow between distributed control components 702 and 704 may both improve the communications management of radio activity controllers 720 and lessen the burden on master control system 640. In this embodiment, all distributed control components of MCS 700 are linked by a dedicated control interface, which provides immunity to communication coordination control messaging in WCD 100 when the master control system 640 is experiencing elevated transactional demands.

An example message packet 900 is disclosed in FIG. 10 in accordance with at least one embodiment of the present invention. Example message packet 900 includes activity pattern information that may be formulated by MRC 600 or radio activity controller 720. The data payload of packet 900 may include, in at least one embodiment of the present invention, at least Message ID information, allowed/disallowed transmission (Tx) period information, allowed/disallowed reception (Rx) period information, Tx/Rx periodicity (how often the Tx/Rx activities contained in the period information occur), and validity information describing when the activity pattern becomes valid and whether the new activity pattern is replacing or added to the existing one. The data payload of packet 900, as shown, may consist of multiple allowed/disallowed periods for transmission or reception (e.g., Tx period 1, 2 . . . ) each containing at least a period start time and a period end time during which radio modem 610 may either be permitted or prevented from executing a communication activity. While the distributed example of MCS 700 may allow radio modem control activity to be controlled real-time (e.g., more control messages with finer granularity), the ability to include multiple allowed/disallowed periods into a single message packet 900 may support radio activity controllers 720 in scheduling radio modem behavior for longer periods of time, which may result in a reduction in message traffic. Further, changes in radio modem 610 activity patterns may be amended using the validity information in each message packet 900.

The modem activity control signal (e.g., packet 900) may be formulated by MRC 600 or radio activity controller 720 and transmitted on MCS 700. The signal includes activity periods for Tx and Rx separately, and the periodicity of the activity for the radio modem 610. While the native radio modem clock is the controlling time domain (never overwritten), the time reference utilized in synchronizing the activity periods to current radio modem operation may be based one of at least two standards. In a first example, a transmission period may start after a pre-defined amount of synchronization events have occurred in radio modem 610. Alternatively, all timing for MRC 600 or between distributed control components 702 may be standardized around the system clock for WCD 100. Advantages and disadvantages exist for both solutions. Using a defined number of modem synchronization events is beneficial because then all timing is closely aligned with the radio modem clock. However, this strategy may be more complicated to implement than basing timing on the system clock. On the other hand, while timing based on the system clock may be easier to implement as a standard, conversion to modem clock timing must necessarily be implemented whenever a new activity pattern is installed in radio modem 610.

The activity period may be indicated as start and stop times. If there is only one active connection, or if there is no need to schedule the active connections, the modem activity control signal may be set always on allowing the radio modems to operate without restriction. The radio modem 610 should check whether the transmission or reception is allowed before attempting actual communication. The activity end time can be used to check the synchronization. Once the radio modem 610 has ended the transaction (slot/packet/burst), it can check whether the activity signal is still set (it should be due to margins). If this is not the case, the radio modem 610 can initiate a new synchronization with MRC 600 or with radio activity controller 720 through synchronizer 730. The same happens if a radio modem time reference or connection mode changes. A problem may occur if radio activity controller 720 runs out of the modem synchronization and starts to apply modem transmission/reception restrictions at the wrong time. Due to this, modem synchronization signals need to be updated periodically. The more active wireless connections, the more accuracy is required in synchronization information.

VIII. Radio Modem Interface to Other Devices.

As a part of information acquisition services, the MCS interface 710 needs to send information to MRC 600 (or radio activity controllers 720) about periodic events of the radio modems 610. Using its MCS interface 710, the radio modem 610 may indicate a time instance of a periodic event related to its operation. In practice these instances are times when radio modem 610 is active and may be preparing to communicate or communicating. Events occurring prior to or during a transmission or reception mode may be used as a time reference (e.g., in case of GSM, the frame edge may be indicated in a modem that is not necessarily transmitting or receiving at that moment, but we know based on the frame clock that the modem is going to transmit [x]ms after the frame clock edge). Basic principle for such timing indications is that the event is periodic in nature. Every incident needs not to be indicated, but the MRC 600 may calculate intermediate incidents itself. In order for that to be possible, the controller would also require other relevant information about the event, e.g. periodicity and duration. This information may be either embedded in the indication or the controller may get it by other means. Most importantly, these timing indications need to be such that the controller can acquire a radio modem's basic periodicity and timing. The timing of an event may either be in the indication itself, or it may be implicitly defined from the indication information by MRC 600 (or radio activity controller 720).

In general terms these timing indications need to be provided on periodic events like: schedule broadcasts from a base station (typically TDMA/MAC frame boundaries) and own periodic transmission or reception periods (typically Tx/Rx slots). Those notifications need to be issued by the radio modem 610: (1) on network entry (i.e. modem acquires network synchrony), (2) on periodic event timing change e.g. due to a handoff or handover and (3) as per the policy and configuration settings in the multiradio controller (monolithic or distributed).

In at least one embodiment of the present invention, the various messages exchanged between the aforementioned communication components in WCD 100 may be used to dictate behavior on both a local (radio modem level) and global (WCD level) basis. MRC 600 or radio activity controller 720 may deliver a schedule to radio modem 610 with the intent of controlling that specific modem, however, radio modem 610 may not be compelled to conform to this schedule. The basic principle is that radio modem 610 is not only operating according to multiradio control information (e.g., operates only when MRC 600 allows) but it is also performing internal scheduling and link adaptation while taking MRC scheduling information into account.

In order to better understand communication in accordance with at least one embodiment of the present invention, exemplary MRC-radio interface primitives are now described. Primitives carry parameters which are needed in multiradio scheduling.

Air_time_enable (MRC to Radio): MRC 600 may use this command to give radio modem 610 permission to operate for a set time. A regular air-time can be enabled for the radio with an interval parameter. Parameters: start_time, period, interval TX/RX/TRX enabled. (See, for example, the previously described communication packet disclosed in FIG. 9)

SYNC_ind (Radio to MRC): Radio modem 610 indicates time dependent issues (e.g. start time of the activity). This primitive may be sent to MRC 600 to indicate when an activity starts if the radio is enabled to use air-time, or when the activity would have started if the radio is currently disabled because of the air_time_enable primitive. MRC 600 uses this indication as a help when composing air_time_enable messages for radio modem 610.

Information_req (MRC to Radio): MRC 600 may use this command to request information that is specified in the parameters of the primitive from radio modem 610.

Information_cnf (Radio to MRC): Radio modem 610 may inform MRC 600 that it has received the Information_req message. Using success and failure parameters, radio modem 610 can indicate whether it can provide the requested information to MRC 600.

Information_ind (Radio to MRC): Radio modem 610 may provide requested information parameters to the MRC 600. One request may result in multiple indications, for example, indications which are sent regularly. These indications may also be sent without a request from MRC 600 (e.g., if remote device wants to change some parameters in a link).

Configuration_change_req (MRC to Radio): MRC 600 may use this primitive to indicate to radio modem 610 that a parameter change is required.

Configuration_change_cnf (Radio to MRC): Radio modem 610 may then indicate to MRC 600 that the required configuration change has succeeded or failed.

Radio modem 610 may also use some other parameters in scheduling (e.g., allowed frequencies), which may be included in a Configuration_change_req message. Allowed frequencies information would be important to radio modem 610 if it were implementing a frequency hopping spread spectrum strategy. If the controller does not allow radio modem 610 to utilize all the frequencies, the modem can take this into account in the scheduling. Even if radio modem 610 is enabled to transmit according to an Air_time_enable message, it may still not transmit if the frequency hopping algorithm lands on a previously disabled frequency at the time the transmission would have occurred. Depending on timing requirements (delay sensitive vs. delay tolerant), the primitives can be either exchanged via MCS 700, or they can be obtained via the protocol stack of WCD 100.

The aforementioned communication primitives may be used in tandem with various communication status indicators to form the interface between a radio modem 610 and the previously discussed radio control elements in MCS 700. FIG. 11A discloses examples of communication status signals which communicate synchronization signals, status and permission to either MRC 600 or radio modem 610 in accordance with at least one embodiment of the present invention. TX_ALLOW in WCD 100 is a status indicator which notifies radio modem 610 (as shown by the arrow pointing to modem 610 in FIG. 11A) when a modem may transmit. For example, when the TX_ALLOW signal is set for a particular modem, the modem is permitted to transmit. This bit may be set by the MRC 610 or radio activity controller 720. Further, RX_ALLOW provides the same functionality with respect to receiving information into radio modem 610. If these bits are not set by MRC 610, then the radio modem 610 may not transmit or receive, respectively.

TX_ACTIVE and RX_ACTIVE are used to indicate to other communication components in WCD 100 when radio modem 610 is actively transmitting or receiving, respectively. These indicators may be read by MRC 600 or other radio modems 610 to determine when a modem is actively communicating. During these periods, MRC 600 may alter planned resource management in order to allow radio modem 610 to complete the current communication transaction. Further, MRC 600 may use these signals to account for the current status of various radio modems 610 in order to plan future communication resource management. For example, based on TX_ACTIVE and RX_ACTIVE for all of the active radio modems 610, MRC 600 may further employ priority rules to determine how to best manage the radio modem resources within WCD 100 so as to avoid possible wireless transmission collisions.

SYNC is a signal for synchronizing to a traffic pattern for radio modem 610. SYNC is the mandatory output signal that sends synchronization pulses that match the clock of radio modem 610. This could mean, for example, a beacon signal for WLAN, or slot border instants for Bluetooth™ or GSM. The SYNC signal pulse is therefore tied to the radio modem's synchronization with its peer, access point or base station element. When the SYNC signal is active, radio modem 610 may broadcast a synchronization signal over MCS 700 to MRC 600 or other radio modems 610. SYNC_VALID is a qualifier for SYNC. In some cases, due for example to handover or handoff of radio modem 610, which may occur when a radio modem 610 is switching from one network access point/base station to another network access point/base station within a communications network, the clock signal of radio modem 610 may change or become unstable. During these periods, it will be advantageous for radio modem 610 to prevent other devices from utilizing this inaccurate clock signal in an attempt to synchronize. The SYNC_VALID signal may change (e.g., become unset or go low) during a period when the clock signal should not be used for synchronization, and the detection of this state may further cause other communication components to enter a delay or hold mode before attempting to resynchronize. When radio modem 610 is no longer in flux (e.g., the clock signal has stabilized) the SYNC_VALID bit may be enabled so that MRC 600 and other communication components seeking to synchronize to radio modem 610 may resume the synchronization process.

FIG. 11A further demonstrates various communication scenarios and the state of interface the status indicators as a result in each case. In the example 1, WCD 100 is wirelessly transmitting information to secondary device 1100. Therefore, at least the TX_ALLOW must be set by MRC 600 to permit the radio modem 610 to send information, and the TX_ACTIVE will be set when the transmission commences. In this case, SYNC_VALID may be set because the modem is in a stable state and any synchronization signal issued by the modem may be valid. In the second example, the converse is happening in that secondary device 1100 is now transmitting to WCD 100. As a result, at least the RX_ALLOW must be set, and the RX_ACTIVE when radio modem 610 enters a receiving mode. Example 3 shows a case where there is no active communication between the WCD 100 and secondary device 1100. The SYNC_VALID may still be set if the modem is in steady state.

Figure 11B:
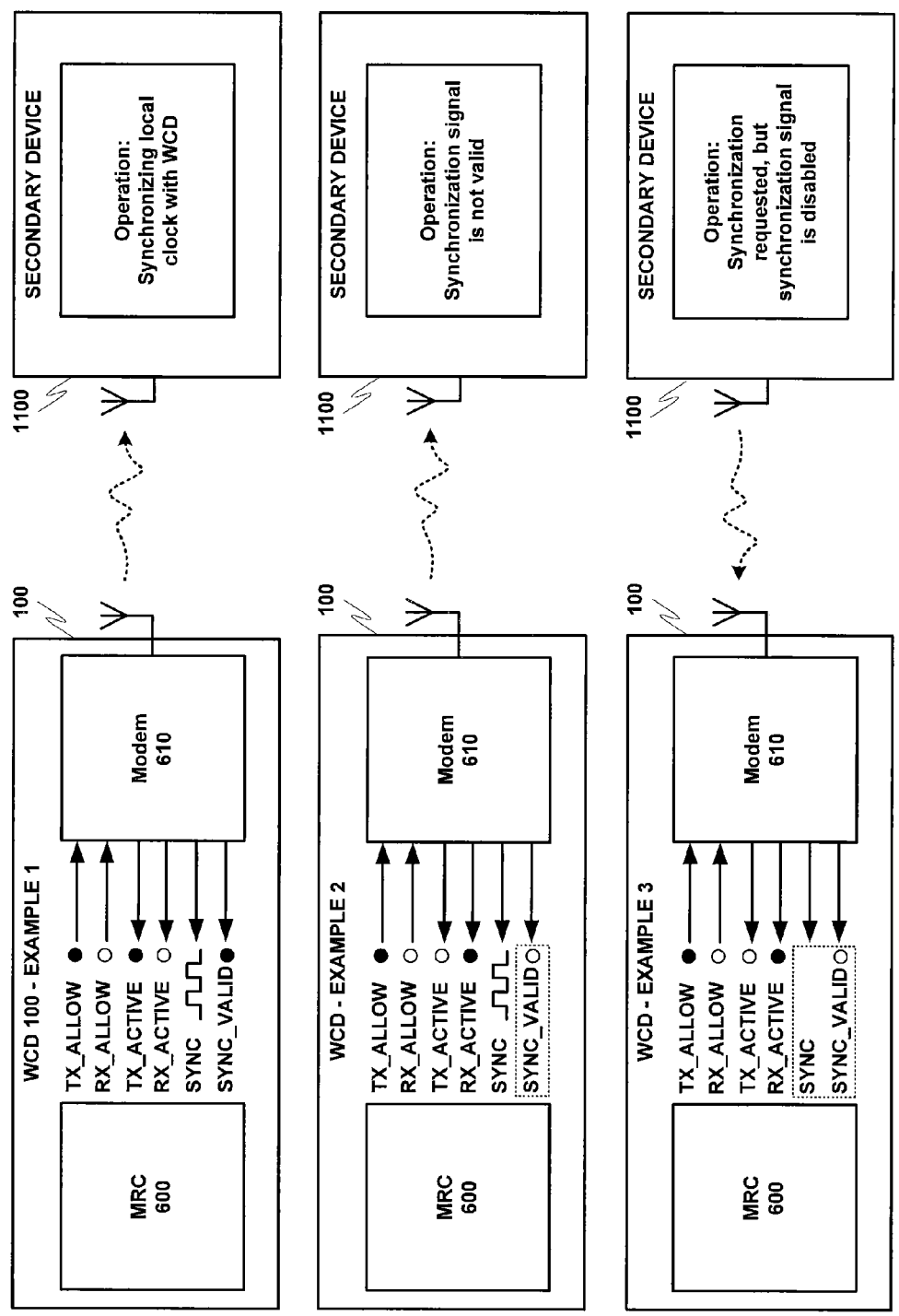
FIG. 11B discloses an exemplary communication interface corresponding to the state of a synchronization signal in a radio modem in accordance with at least one embodiment of the present invention.

FIG. 11B explores synchronization scenarios in view of the previously described communication interface. In Example 1, a synchronization is occurring between WCD 100 and secondary device 1100. In this case, the SYNC signal is active and SYNC_VALID is enabled to allow other components, such as MRC 600 and other radio modems 610, as well as external devices, such as secondary device 1100, to synchronize. However, in example 2 there is an instability in the communication network of radio modem 610. There may be a network handoff or handover occurring, or clock drifting may be occurring. Due to the clock drifting (e.g. in Bluetooth) secondary device 1100 may not capable of receiving the synch-burst from WCD 100, which may cause an error situation where secondary device 1100 cannot identify from the expected master slot the required synch-field and cannot process the received packet. As a corrective procedure, the slave device, for example, may prolong its "receiving window." As a further indication to MRC 600 of the state of the secondary device, the SYNC_VALID signal may be disabled, or unset, until the secondary device 1100 is again synchronized with WCD 100.

Once the SYNC_VALID indicates that the clocking of radio modem 610 is invalid, the SYNC signal may further be disabled or prevented from broadcasting as shown in example 3. This action may be a secondary precaution to prevent other internal components and/or external devices from synchronizing until the clock signal stabilizes. Further, other components (such as MRC 600 and other radio modems 610) and secondary device 1100 may enter a delay or hold mode until the SYNC_VALID signal is reset. This mode may maintain the device or components in a safe mode until a re-synchronization is allowed by radio modem 610.

FIG. 12 discloses an exemplary process flowchart in accordance with at least one embodiment of the present invention. In step 1202, MRC 600 monitors all of the active radio modems 610. An internal component (e.g. MRC 600 and/or other radio modem 610) or an external device (e.g., secondary device 1100) then requires synchronization to the clock of radio modem 610 in step 1206. The SYNC signal may then be enabled (if not already enabled) in step 1206, and a synchronization signal may then be broadcast by radio modem 610. However, in step 1208 a determination is made as to whether the clock signal in radio modem 610 is unstable due to a change of state (as previously described). If the state is unstable, then in step 1210 the SYNC_VALID is disabled (unset) and the MRC 600 and/or other radio modems 610 are prevented from synchronizing (step 1212). This may further cause these components to enter a hold or safe state in step 1214 until the SYNCH_VALID is enabled. Again, the status of radio modem 610 is checked in step 1216. If the clock signal has not become stable, then the communication system in WCD 100 remains in a hold or safe state by returning to 1210. Once the state of radio modem 610 is stabilized, the SYNC_VALID may be enabled in step 1218, and the MRC 600 and/or other radio modems 610 (as well as external devices) may synchronize. Once the requested synchronization is completed, the SYNCH signal may be deactivated to stop the synchronization signal broadcast (e.g., to clear MCS 700 for other communication traffic) in step 1222.

The present invention is an improvement over the state of the art. The multipoint control system of the present invention allows a device with a plurality of active radio modems to efficiently manage communications between these modems in order to avoid potential communication conflicts. This scheduling of wireless communication resources allows a wireless communication device to function in a fully enabled mode without experiencing communication quality degradation due to the constant retransmission of lost packets. Further, accommodation for occasional radio modem instability allows for the prevention of bad synchronization and, as a result, the possible disruption of active wireless communication.

Accordingly, it will be apparent to persons skilled in the relevant art that various changes in forma and detail can be made therein without departing from the spirit and scope of the invention. This the breadth and scope of the present invention should not be limited by any of the above-described exemplary embodiments, but should be defined only in accordance with the following claims and their equivalents.

What is claimed:

1. A method, comprising:
   detecting a change in an existing wireless communication link through a network interface of a radio modem in a multiradio apparatus, the change causing the radio modem to lose synchronization with a wireless network;
   in response to the detected change, altering a condition indicator related to a clock signal associated with the radio modem; and
   indicating through a dedicated radio modem control interface in the radio modem, to at least one other radio modem in the multiradio apparatus, that the clock signal is invalid using the altered condition indicator.

2. The method of claim 1, wherein the change causing the radio modem to lose synchronization with the wireless network occurs due to at least one of handoff/handover in the wireless communication network and clock drift in the clock of the radio modem.

3. The method of claim 1, wherein the indicator is provided by the radio modem in order to prevent the at least one other radio modem from synchronizing to the clock signal of the radio modem.

4. The method of claim 1, wherein altering the condition indicator includes changing the state of a SYNC_VALID signal pertaining to the radio modem.

5. The method of claim 4, further comprising recognizing that the clock signal is invalid by reading the status of the SYNC_VALID signal.

6. The method of claim 5, wherein recognizing that the clock signal is invalid comprises another radio modem reading the status of the SYNC_VALID signal.

7. The method of claim 5, wherein recognizing that the clock signal is invalid comprises a controller reading the status of the SYNC_VALID signal, the controller being a multiradio controller in the same device as the radio modem and being at least one of a solitary component or a distributed controller divided amongst other components in the device.

8. The method of claim 7, wherein the multiradio controller is connected to the radio modem via a dedicated interface for conveying time-sensitive information, and the condition indicator is provided to the multiradio controller over the dedicated interface.

9. The method of claim 1, further comprising causing the radio modem to stop broadcasting synchronization information based on the condition indicator.

10. The method of claim 1, further comprising causing a controller and at least one other radio modem under control of the controller to enter a hold state until the condition indicator changes.

11. A computer program product comprising computer executable program code recorded on a non-transitory computer readable storage medium, the computer executable program code comprising:
  code configured to cause an apparatus to detect a change in an existing wireless communication link through a network interface of a radio modem in a multiradio apparatus, the change causing the radio modem to lose synchronization with a wireless network;
  code configured to cause an apparatus to, in response to the detected change, alter a condition indicator related to a clock signal associated with the radio modem; and
  code configured to indicate through a dedicated radio modem control interface in the radio modem, to at least one other radio modem in the multiradio apparatus, that the clock signal is invalid using the altered condition indicator.

12. The computer program product of claim 11, wherein the change causing the radio modem to lose synchronization with the wireless network occurs due to at least one of handoff/handover in the wireless communication network and clock drift in the clock of the radio modem.

13. The computer program product of claim 11, wherein the indicator is provided by the radio modem in order to prevent the at least one other radio modem from synchronizing to the clock signal of the radio modem.

14. The computer program product of claim 11, wherein altering the condition indicator includes changing the state of a SYNC_VALID signal pertaining to the radio modem.

15. The computer program product of claim 14, further comprising code configured to cause the apparatus to recognize that the clock signal is invalid by reading the status of the SYNC_VALID signal.

16. The computer program product of claim 15, wherein recognizing that the clock signal is invalid comprises another radio modem reading the status of the SYNC_VALID signal.

17. The computer program product of claim 15, wherein recognizing that the clock signal is invalid comprises a controller reading the status of the SYNC_VALID signal, the controller being a multiradio controller in the same device as the radio modem and being at least one of a solitary component or a distributed controller divided amongst other components in the device.

18. The computer program product of claim 17, wherein the multiradio controller is connected to the radio modem via a dedicated interface for conveying time-sensitive information, and the condition indicator is provided to the multiradio controller over the dedicated interface.

19. The computer program product of claim 11, further comprising code configured to cause the apparatus to cause the radio modem to stop broadcasting synchronization information based on the condition indicator.

20. The computer program product of claim 11, further comprising code configured to cause the apparatus to cause a controller and at least one other radio modem under control of the controller to enter a hold state until the condition indicator changes.

21. A device, comprising:
  at least one processor; and
  at least one memory including executable instructions, the at least one memory and the executable instructions being configured to, in cooperation with the at least one processor, cause the device to perform at least the following:
    detect a change in an existing wireless communication link through a network interface of a radio modem in a multiradio apparatus, the change causing the radio modem to lose synchronization with a wireless network;
    in response to the detected change, alter a condition indicator related to a clock signal associated with the radio modem; and
    indicate through a dedicated radio modem control interface in the radio modem, to at least one other radio modem in the multiradio apparatus, that the clock signal is invalid using the altered condition indicator.

22. The device of claim 21, wherein the change causing the radio modem to lose synchronization with the wireless network occurs due to at least one of handoff/handover in the wireless communication network and clock drift in the clock of the radio modem.

23. The device of claim 21, wherein the indicator is provided by the radio modem in order to prevent the at least one other radio modem from synchronizing to the clock signal of the radio modem.

24. The device of claim 21, wherein altering the condition indicator includes changing the state of a SYNC_VALID signal pertaining to the radio modem.

25. The device of claim 24, further comprising the at least one memory and the executable instructions being configured to, in cooperation with the at least one processor, cause the device to recognize that the clock signal is invalid by reading the status of the SYNC_VALID signal.

26. The device of claim 25, wherein recognizing that the clock signal is invalid comprises another radio modem reading the status of the SYNC_VALID signal.

27. The device of claim 25, wherein recognizing that the clock signal is invalid comprises a controller reading the status of the SYNC_VALID signal, the controller being a multiradio controller in the same device as the radio modem and being at least one of a solitary component or a distributed controller divided amongst other components in the device.

28. The device of claim 27, wherein the multiradio controller is connected to the radio modem via a dedicated interface for conveying time-sensitive information, and the condition indicator is provided to the multiradio controller over the dedicated interface.

29. The device of claim 21, further comprising the at least one memory and the executable instructions being configured to, in cooperation with the at least one processor, cause the device to cause the radio modem to stop broadcasting synchronization information based on the condition indicator.

30. The device of claim 21, further comprising the at least one memory and the executable instructions being configured to, in cooperation with the at least one processor, cause the device to cause a controller and at least one other radio modem under control of the controller to enter a hold state until the condition indicator changes.

31. A multiradio controller, comprising:
  a receiving interface configured to recognize an indicator in a radio modem interface indicating that a clock signal associated with the radio modem is invalid causing the loss of synchronization with a wireless network; and
  a controller configured to cause the multiradio controller to enter a delay mode to cause at least one other radio modem associated with the multiradio controller to enter a hold mode until the indicator in the radio modem interface changes.

32. The multiradio controller of claim 31, wherein the multiradio controller is at least one of a solitary component and a distributed controller divided amongst other components in the wireless communication device.

33. The multiradio controller of claim 31, wherein the multiradio controller is connected to the radio modem via a dedicated interface for conveying time-sensitive information, and the condition indicator is provided to the multiradio controller over the dedicated interface.

34. The multiradio controller of claim 31, wherein the delay mode prevents the multiradio controller from synchronizing with the radio modem.

35. A radio modem, comprising:
   wherein the radio modem is a component of a multiradio apparatus;
   a network interface configured to communicate via a wireless communication link;
   a detection module configured to detect a change in the existing wireless communication link being conducted via the network interface, the change causing the radio modem to lose synchronization with a wireless network; and
   a radio modem interface configured to alter a condition indicator to indicate to at least one other radio modem in the multiradio apparatus, that the clock signal of the radio modem is invalid.

* * * * *

UNITED STATES PATENT AND TRADEMARK OFFICE
CERTIFICATE OF CORRECTION

PATENT NO. : 8,325,703 B2
APPLICATION NO. : 11/465041
DATED : December 4, 2012
INVENTOR(S) : Ville Pernu It is certified that error appears in the above-identified patent and that said Letters Patent is hereby corrected as shown below:

On the Title Page

In Item [75] Inventor, "Tempere" should read, "Tampere"

Signed and Sealed this
Second Day of July, 2013

Teresa Stanek Rea
*Acting Director of the United States Patent and Trademark Office*